United States Patent
Seo et al.

(10) Patent No.: US 8,199,781 B2
(45) Date of Patent: Jun. 12, 2012

(54) DEVICE AND METHOD FOR DEMULTIPLEXING RECEIVED TRANSPORT STREAM IN DIGITAL BROADCASTING RECEIVER

(75) Inventors: Jeong-Wook Seo, Daegu (KR); Jong-Kerl Lee, Gumi-si (KR); Wei-Jin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1946 days.

(21) Appl. No.: 11/302,353

(22) Filed: Dec. 13, 2005

(65) Prior Publication Data

US 2006/0133429 A1    Jun. 22, 2006

(30) Foreign Application Priority Data

Dec. 14, 2004   (KR) .................. 10-2004-0105877
Dec. 13, 2005   (KR) .................. 10-2005-0122479

(51) Int. Cl.
    *H04J 3/02* (2006.01)
(52) U.S. Cl. .................. 370/535; 725/151; 386/52
(58) Field of Classification Search .......... 370/533, 370/536, 537, 538, 535; 725/151, 153, 68; 386/52, 55, 111, 112
    See application file for complete search history.

(56) References Cited

U.S. PATENT DOCUMENTS

| | | | |
|---|---|---|---|
| 5,835,591 A | 11/1998 | Cochon et al. | |
| 6,438,145 B1 | 8/2002 | Movshovich et al. | |
| 6,467,093 B1 * | 10/2002 | Inoue et al. | 725/151 |
| 6,781,601 B2 * | 8/2004 | Cheung | 345/629 |
| 6,804,266 B1 | 10/2004 | Kovacevic et al. | |
| 2001/0000046 A1 * | 3/2001 | Wright et al. | 712/11 |
| 2008/0025389 A1 * | 1/2008 | Markman et al. | 375/240.02 |

FOREIGN PATENT DOCUMENTS

| | | |
|---|---|---|
| EP | 0 782 346 | 7/1997 |
| EP | 0 917 356 | 5/1999 |
| EP | 1 158 783 | 11/2001 |
| JP | 10-108144 | 4/1998 |
| JP | 2000-078193 | 3/2000 |
| JP | 2001-339721 | 12/2001 |
| JP | 2002-271773 | 9/2002 |
| WO | WO 03/084164 | 10/2003 |

* cited by examiner

*Primary Examiner* — Huy D Vu
*Assistant Examiner* — Dady Chery
(74) *Attorney, Agent, or Firm* — The Farrell Law Firm, P.C.

(57) ABSTRACT

Disclosed herein is a device and method for demultiplexing in a digital broadcasting receiver for processing packet data configured by a packet header and a payload. A buffer buffers input packet data. Processors are parallel connected to the buffer. A packet header processor checks a packet header, identifies the presence of adaptation information, and generates a control signal according to the presence of the adaptation information. An adaptation information processor processes the adaptation information of buffered payload data under control of the packet header processor. A Packetized Elementary Stream (PES) header processor processes a PES header of the buffered payload data under the control of the packet header processor. A data processor generates an audio or video Elementary Stream (ES) from audio or video data of the buffered payload data under control of the PES header processor, and outputs the generated audio or video ES to an associated decoder.

30 Claims, 20 Drawing Sheets

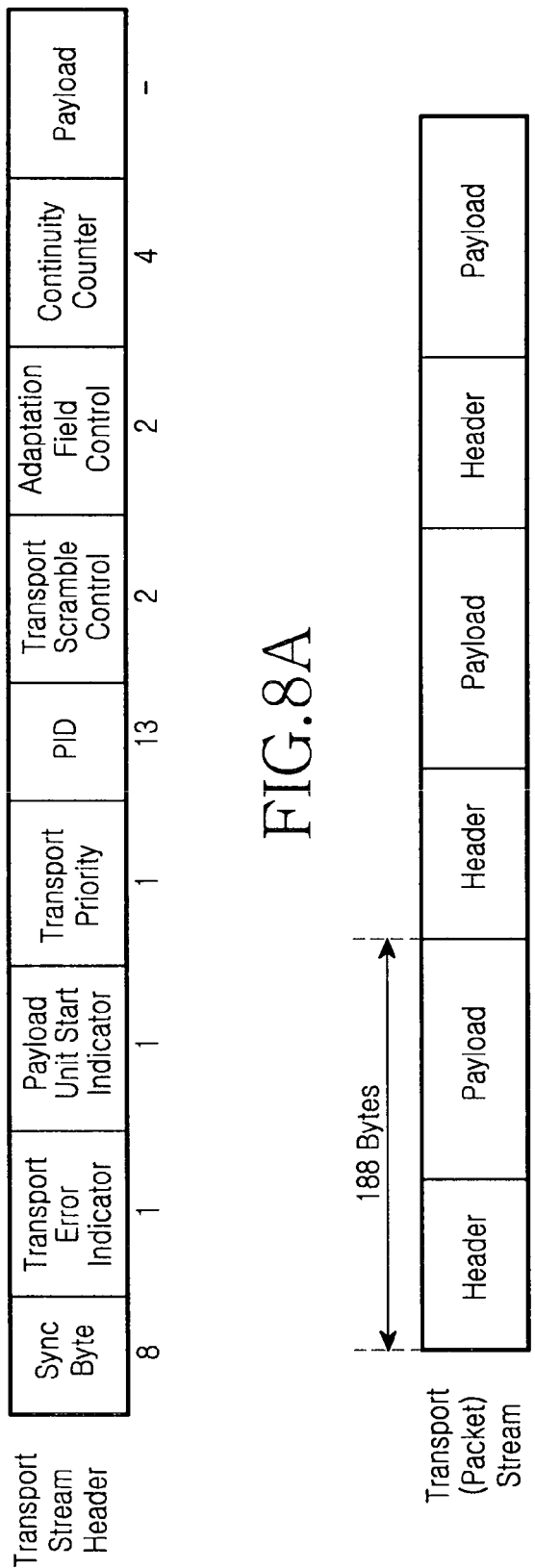

Adaptation Field

| Adaptation Field Length | Discontinuity Indicator | Random Access Indicator | ES Priority Indicator | 5 Flags | Optional Field 1 | Stuffing Bytes |
|---|---|---|---|---|---|---|
| 8 | 1 | 1 | 1 | 5 | - | - |

FIG.9A

Optional Field 1

| PCR | OPCR | Splice Countdown | Transport Private Data Length | Transport Private Data Data | Adaptation Field Extension Length | 3 Flags | Optional Field 2 |
|---|---|---|---|---|---|---|---|
| 42 | 42 | 8 | 8 | - | 8 | 3 | - |

FIG.9B

Optional Field 2

| LTW_VALID Flag | LTW Offset | - | Piecewise Rate | Splice Type | DTS_Next_Au |
|---|---|---|---|---|---|
| 1 | 15 | 2 | 22 | 4 | 33 |

| Optional PES Header | '10' | PES Scrambling Control | PES Priority | Data Alignment Indicator | Copyright | Original or Copy | 7 Flags | PES Header Data Length | PES Optional Field 1 | Stuffing Bytes (0xFF) |
|---|---|---|---|---|---|---|---|---|---|---|
| | 2 | 2 | 1 | 1 | 1 | 1 | 8 | 8 | — | — |

FIG.10B

| PES Optional Field 1 | PTS/DTS | ESCR | ES Rate | DSM Trick Mode | Additional Copy Info | Previous PES CRC | PES Extension |
|---|---|---|---|---|---|---|---|
| | 33 | 42 | 22 | 22 | 8 | 16 | |

DEVICE AND METHOD FOR DEMULTIPLEXING RECEIVED TRANSPORT STREAM IN DIGITAL BROADCASTING RECEIVER

PRIORITY

This application claims the benefit under 35 U.S.C. §119 (a) of an application entitled "Device and Method for Demultiplexing Received Transport Stream in Digital Broadcasting Receiver" filed in the Korean Intellectual Property Office on Dec. 14, 2004 and assigned Serial No. 105877/2004 and an application entitled "Device and Method for Demultiplexing Received Transport Stream in Digital Broadcasting Receiver" filed in the Korean Intellectual Property Office on Dec. 13, 2005 and assigned Serial No. 122479/2005, the entire contents of both of which are incorporated herein by reference.

BACKGROUND OF THE INVENTION

1. Field of the Invention

The present invention generally relates to a device and method for providing an additional service in a wireless terminal, and more particularly to an apparatus and method that can receive and process a digital broadcasting signal.

2. Description of the Related Art

Standardization for the current digital broadcasting is actively in progress in the world. For the digital broadcasting, a Digital Multimedia Broadcasting (DMB) system of the United States and a Digital Video Broadcasting (DVB) system of Europe are present. A wireless terminal having a digital broadcasting receiver is provided with a tuner, a demodulator, and a multimedia processor for digital broadcasting reception, and so on.

FIG. 1 is a block diagram illustrating an operation for multiplexing a Transport Stream (TS) signal in a digital broadcasting transmitter.

Referring to FIG. 1, a video encoder 111 of the transmitter encodes video data to generate a video Elementary Stream (ES). Here, the video ES may be video data based on Moving Picture Experts Group (MPEG)-2, MPEG-4, or H.264 standard. An audio encoder 121 encodes audio data to generate an audio ES. The audio ES may be audio data based on MPEG-1 (mp1/mp2/mp3), Advanced Audio Coding (AAC), or Bit Sliced Arithmetic Coding (BSAC).

A packetization process is required to multiplex video, audio, and data. Accordingly, a video packet assembler 113 adds time information, adaptation information and a packet header to a video ES signal and outputs a video Packetized Elementary Stream (PES). An audio packet assembler 123 adds the above-described information to an audio ES to be assembled in an audio packet, and outputs an audio PES signal. A data packet assembler (not illustrated) performs an operation similar as described above.

Then, a multiplexer 130 multiplexes video, audio, and data PES signals and outputs a TS signal. The multiplexer 130 performs a function for multiplexing a plurality of inputs into one output. Here, the inputs may be broadcasting information data packets associated with video, audio, programs, services, and so on.

In the structure of FIG. 1, the packet assemblers 113 and 123 and the multiplexer 130 may configure a TS multiplexer.

A demultiplexer 140 of the digital broadcasting receiver for receiving the multiplexed TS signal as described above has a structure as illustrated in FIG. 2.

Referring to FIG. 2, the demultiplexer 140 for receiving the TS signal analyzes header information of the TS signal, separates video, audio, and data, and outputs PES signals mapped thereto. A video packet disassembler 151 receives a video PES signal separated in the demultiplexer 140, analyzes a header of the received video PES signal, generates a video ES signal, and outputs the generated video ES signal to a video decoder 153. Similarly, an audio packet disassembler 161 and an audio decoder 163 perform the same operation as described above. In the following description, it is assumed that a demultiplexer includes the demultiplexer 140 and the packet disassemblers 151 and 161.

It can be seen that the demultiplexer of the digital broadcasting receiver performs the inverse operation of the multiplexer of the digital broadcasting transmitter. FIG. 3 is a block diagram illustrating a structure of the demultiplexer.

Referring to FIG. 3, a sync detector 211 detects a sync byte of a packet header from a received TS signal, and stores the received TS signal in an input buffer 221 when the sync byte is detected. The input buffer 221 buffers data of a packet size. A packet header processor 224 extracts and processes the packet header from the buffer 221 and outputs the remaining data except the packet header to a buffer 223. An adaptation information processor 215 extracts and processes adaptation information, and outputs the remaining data except the adaptation information to a buffer 225. A PES header processor 217 extracts and processes a PES header from the buffer 225, and outputs the remaining information except the PES header to a buffer 227. A data processor 219 extracts data from the buffer 227 and outputs a video or audio ES.

The conventional demultiplexer 140 with the structure as illustrated in FIG. 3 has a serial data processing structure. That is, when the sync detector 211 detects a byte sync signal, the input buffer 221 buffers subsequent data in a packet size. After data of one packet is buffered in the buffer 221, the packet header processor 224 operates and analyzes a packet header. The conventional demultiplexer as described above is provided with the buffers 221 and 223 in front-ends of the processors, and employs a method for receiving processed packet data from the front-ends to process packets. Because the demultiplexing operation is performed in the serial structure, delay occurs when the input TS signal is multiplexed.

The above-described serial demultiplexing structure may unnecessarily perform a data processing operation. In this case, the packets configuring the input TS signal may not include adaptation information and/or PES information. That is, the packets configuring the received TS signal may be mostly constructed by true data. In this case, the packets constructed by only the true data also pass through the adaptation information processor 215 and/or the PES header processor 217. An unnecessary processing operation is performed which may increase system load and reduce a processing rate. Actual data packets (or audio/video data ESs) of the input packet data are mostly present in PES header packets. Accordingly, the PES header processor mostly transfers data to the data processor such that an ES can be extracted.

The structure of the demultiplexer as illustrated in FIG. 3 is provided with the buffers 221 to 227 in the front-ends and/or rear-ends of the processors. In this case, a buffer memory increases because the buffers 221 to 227 have the capacity of more than a packet size.

FIG. 4 is a flowchart illustrating a procedure for detecting synchronization of a TS signal (or packet stream) input to the demultiplexer.

Referring to FIGS. 3 and 4, the sync detector 211, checks bytes of the input TS signal. If an input byte is a sync byte of "0X47", the sync detector 211 detects the sync byte in step 461. The sync detector 211 re-arranges the sync byte as a first byte and transfers the first byte to the buffer 221 in step 467. However, if the input byte is not a sync byte, the sync detector 211 transfers the bytes to a designated byte buffer of the buffer 221 one by one in step 463. After the byte data input as described above is transferred, the next byte buffer of the buffer 221 is connected such that the next byte can be transferred to the next byte position of the buffer 221 when the next byte is input in step 465. The above-described operation is repeatedly performed until the end time.

The conventional packet synchronization method repeatedly performs an operation for retrieving input byte data and re-arranging a buffer position of the buffer 221 when the input byte data is a sync byte. Accordingly, the conventional synchronization detection method must retrieve a sync signal from every packet of a TS signal in the demultiplexer 140 of the serial structure as illustrated in FIG. 3. That is, the sync detector 211 must retrieve the sync signal from every packet of the TS signal, detect the start of packet data after detecting the sync signal, and apply the remaining packet data to the buffer 221. However, a sync signal position of consecutive packet data can be detected once a sync signal of the packet data is detected because the TS signal is a conventional packet stream. Synchronization of packet data can be detected without retrieving a sync signal from every packet, but the conventional demultiplexer 140 repeatedly performs the operation for retrieving the sync signal from every packet.

SUMMARY OF THE INVENTION

It is, therefore, an object of the present invention to provide an apparatus and method that can demultiplex data received in a digital broadcasting receiver in a parallel structure and can distribute the multiplexed data to respective decoders.

It is another object of the present invention to provide an apparatus and method that can buffer data received in a digital broadcasting receiver in a packet size, analyze a header of the buffered packet data, operate an associated processor on the basis of header information, and process and demultiplex the packet data.

It is another object of the present invention to provide an apparatus and method that can buffer data received in a digital broadcasting receiver in a packet size, determine if adaptation information is included in header information of the buffered packet data, operate only a Packetized Elementary Stream (PES) header processor if the adaptation information is absent, and demultiplex the received data.

It is another object of the present invention to provide an apparatus and method that can buffer data received in a digital broadcasting receiver in a packet size, determine if adaptation information is included in header information of the buffered packet data, operate an adaptation information processor if the adaptation information is included, and process the adaptation information.

It is another object of the present invention to provide an apparatus and method that can buffer serial data received in a digital broadcasting receiver in a packet size, output the buffered packet data in parallel, and transfer the parallel packet data to a processor.

It is yet another object of the present invention to provide an apparatus and method that can identify a sync signal of packet data received in a digital broadcasting receiver, extract a difference value after identifying a sync position in a non-synchronization state, delay the input data, and set synchronization of the packet data.

In accordance with an embodiment of the present invention for achieving the above objects, there is provided an apparatus for demultiplexing in a digital broadcasting receiver for processing packet data constructed by a packet header and a payload, including a buffer for buffering input packet data; and a plurality of processors parallel connected to the buffer, with the plurality of processors including a packet header processor for checking a packet header of the buffered packet data, determining if adaptation information is included, and generating a control signal when the adaptation information is determined to be present; an adaptation information processor for processing the adaptation information of the buffered input payload controlled by the packet header processor; a Packetized Elementary Stream (PES) header processor for processing a PES header of the buffered input payload data controlled by the packet header processor; and a data processor for generating an audio or video Elementary Stream (ES) from audio or video data of the buffered input payload data controlled by the PES header processor, and outputting the generated audio or video ES to an associated decoder.

The packet header processor analyzes an adaptation information control parameter of the packet header, determines if the payload data includes the adaptation information, controls the adaptation information processor to process the adaptation information if the adaptation information is included, and controls an operation of the PES header processor if the adaptation information is not included.

The adaptation information processor analyzes an adaptation information field buffered in the buffer, analyzes a length of the adaptation information, processes the adaptation information to transfer a process result to a controller when the payload data is constructed by only the adaptation information, reports a position of data except the adaptation information buffered in the buffer to the PES header processor when the payload data includes other data, and processes the adaptation information to transfer a process result to the controller.

The PES header processor determines if the PES header is included in a payload buffered in the buffer, identifies a length of the PES header to process the PES header and transfer a process result to the controller when the PES header is included, and reports a position of data except the PES header buffered in the buffer to the data processor.

The packet header processor analyzes a Product Identifier (PID) of the packet header and transfers the PID for identifying a buffered packet to the data processor. The data processor generates audio or video ES data from audio or video data of the buffered input payload data, and transfers the generated audio or video ES data to an associated decoder.

The buffer includes first and second buffers having a packet size; and an address generator for controlling an operation for outputting packet data stored in the second buffer while the input packet data is stored in the first buffer, and an operation for outputting packet data stored in the first buffer while the input packet data is stored in the second buffer. The buffer includes a dual port memory of a data size; a first address generator for storing the input packet data in the memory; and a second address generator for outputting the packet data stored in the memory.

The apparatus further includes a sync detector for checking a buffering position of a sync byte in the packet data buffered in the buffer, checking a sync byte buffering position of the buffer to detect a difference value, delaying byte data of the packet data according to the difference value, and setting packet synchronization. The sync detector includes a sync identification unit for determining if the byte data stored in the buffer is a sync byte; a difference extractor for identifying the buffering position of the sync byte stored in the buffer when the sync identification unit detects the sync byte, and computing the difference value between the sync byte buffering position set in the buffer and the buffering position of the stored sync byte; and a delay unit for delaying the input packet data according to the computed difference value, and buffering the delayed data in the buffer. The sync byte buffering position set in the buffer is a first byte buffering position of the buffer.

In accordance with an embodiment of the present invention for achieving the above objects, there is provided an apparatus for receiving broadcasting data in a wireless terminal with a digital broadcasting receiver, including a broadcasting receiver for receiving and demodulating a signal of a set broadcasting channel and outputting a packet data stream; a multimedia processor for analyzing the packet data stream and generating decoded video and audio data; a display unit for displaying the decoded video data; and a speaker for reproducing the decoded audio data, wherein the multimedia processor includes a demultiplexer comprising a buffer for buffering the packet data stream and processors parallel connected to the buffer, the processors processing the buffered packet data in parallel and performing demultiplexing; a video decoder for decoding demultiplexed video Elementary Stream (ES) data; and an audio decoder for decoding demultiplexed audio ES data.

The broadcasting receiver receives and demodulates a broadcasting channel signal at a set frequency, checks a Product Identifier (PID) of a demodulated packet stream, filters packet data of a set broadcasting channel, and generates an Internet Protocol (IP) datagram. The multimedia processor furtherincludes an IP decapsulator for decapsulating IP information of the IP datagram and outputting a decapsulating result to the demultiplexer.

In accordance with an embodiment of the present invention for achieving the above objects, there is provided a method for demultiplexing packet data constructed by a packet header and a payload in a digital broadcasting receiver, which includes buffering input packet data; checking a buffered packet header and determining if a payload is adaptation information; processing buffered adaptation information if the payload is the adaptation information; checking the payload if the payload is not the adaptation information, determining if a Packetized Elementary Stream (PES) header is included in the payload, checking a size of the PES header included in the payload if the PES header is included, determining if audio/video data is included, setting a buffering position of the audio/video data if the audio/video data is included, and processing the PES header; and processing the audio/video data of the payload after the PES header is processed or if the PES header is not included in the payload of the packet data, generating an audio/video Elementary Stream (ES), and transferring the generated audio/video ES to an associated decoder.

The method further includes a sync detection for checking a buffering position of a sync byte in the buffered packet data, checking a sync byte buffering position to detect a difference value, delaying byte data of the packet data according to the difference value, and setting packet synchronization. The sync detection step includes determining if the byte data stored in a buffer is a sync byte; identifying the buffering position of the sync byte stored in the buffer when the sync byte is detected, and computing the difference value between the sync byte buffering position set in the buffer and the buffering position of the stored sync byte; and delaying the input packet data according to the computed difference value, and buffering the delayed data in the buffer. The sync byte buffering position set in the buffer is a first byte buffering position of the buffer for buffering first packet data.

The step of processing the packet header including determining if a Product Identifier (PID) of the packet header is a target PID, and storing information for identifying a type of an input packet only when the PID of the packet header is the target PID; analyzing an adaptation information control parameter of the packet header, issuing a command for an adaptation information processing operation if a buffered packet includes the adaptation information, and transferring buffering position information of the adaptation information to be processed in the adaptation information processing operation; and issuing a command for a PES header processing operation if a buffered packet does not include the adaptation information, and transferring buffering position information of the PES header to be processed in the PES header processing operation.

The step of processing the adaptation information includes accessing the adaptation information buffered in the buffer and analyzing a length of the adaptation information when the operation command is received; processing the adaptation information to transfer a processing result to a controller when the packet is constructed by only the adaptation information in the analyzing step; and transferring the operation command and buffering position information of the PES header when the packet includes the PES header, processing the adaptation information, and transfers a processing result to the controller.

The step of processing the PES header includes accessing the PES header buffered in the buffer and analyzing a length of the PES header when the operation command is received; processing the PES header to transfer a processing result to a controller when the packet is constructed by only the PES header in the analyzing step; and transferring an operation command for a data processor and buffering position information of actual data when the buffered packet includes the actual data in the analyzing step, transferring a command for a data processing operation and position information of buffered actual data, processing the PES header, and transferring a processing result to the controller.

The step of processing the data includes identifying a type of the packet according to a stored PID when the operation command is received; and accessing the buffered actual data, generating a video or audio ES from the actual data according to the identified PID, and demultiplexing the video or audio ES into the associated decoder.

In accordance with an embodiment of the present invention for achieving the above objects, there is provided a method for processing broadcasting data in a wireless terminal with a digital broadcasting receiver, including performing a broadcasting data reception operation for receiving and demodulating a signal of a set broadcasting channel and outputting a packet data stream; performing a multimedia data processing operation for analyzing the packet data stream and generating decoded video and audio data; and reproducing the decoded video and audio data, wherein the step of performing the multimedia data processing operation includes buffering the packet data stream, checking a packet header and a payload of buffered packet data, processing the buffered packet data in parallel, and performing demultiplexing into video and audio Elementary Stream (ES) data; and decoding the demultiplexed video and audio ES data.

The step of receiving the broadcasting data includes receiving and demodulating a broadcasting channel signal at a set frequency, checking a Product Identifier (PID) of a demodulated packet stream, filtering packet data of a set broadcasting channel, and generating an Internet Protocol (IP) datagram, wherein the step of processing the multimedia data further includes decapsulating IP information of the IP datagram, and wherein a packet data stream from the IP information is decapsulated is demultiplexed.

BRIEF DESCRIPTION OF THE DRAWINGS

The above and other objects, features and advantages of the present invention will be more apparent from the following detailed description taken in conjunction with the accompanying drawings, in which:

FIGS. 8A to 8C illustrate a structure of a received packet;

FIGS. 9A to 9C illustrate a structure of adaptation information included in the received packet;

FIGS. 10A to 10D illustrate a structure of Packetized Elementary Stream (PES) information included in the received packet;

DETAILED DESCRIPTION OF THE PREFERRED EMBODIMENTS

Figure 1:
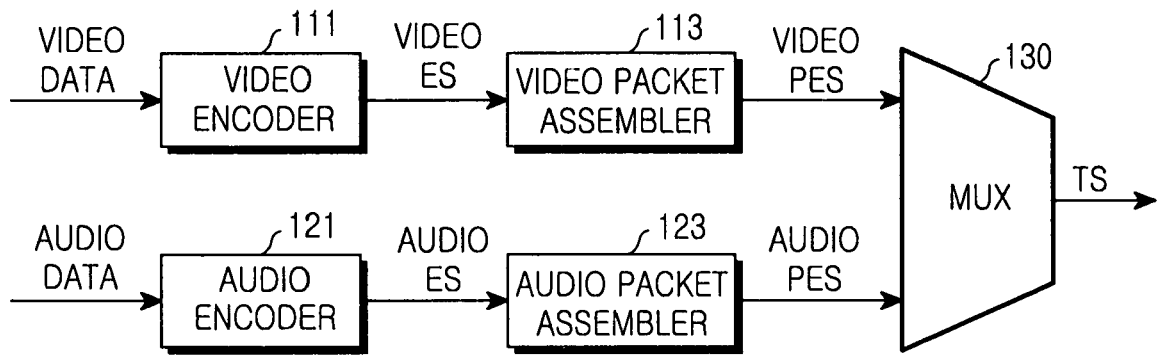
FIG. 1 is a block diagram illustrating a concept of multiplexing a signal to be transmitted in a digital broadcasting transmitter.
Figure 2:
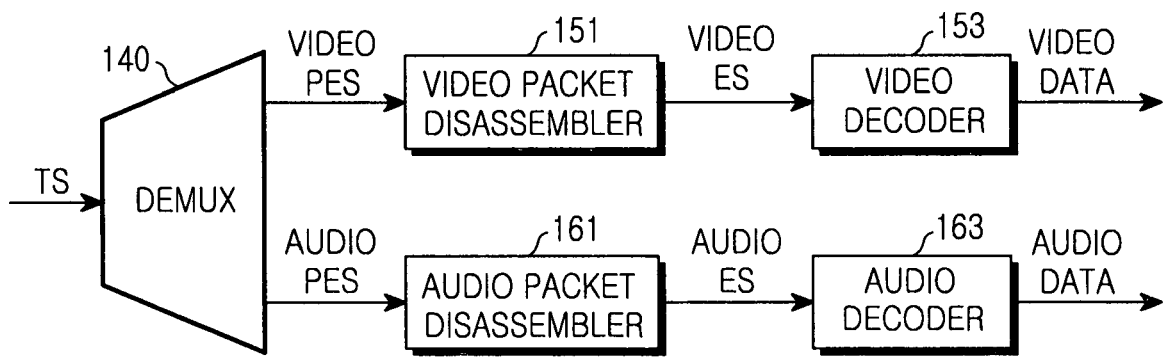
FIG. 2 is a block diagram illustrating a concept of demultiplexing a received signal in a digital broadcasting receiver.
Figure 3:
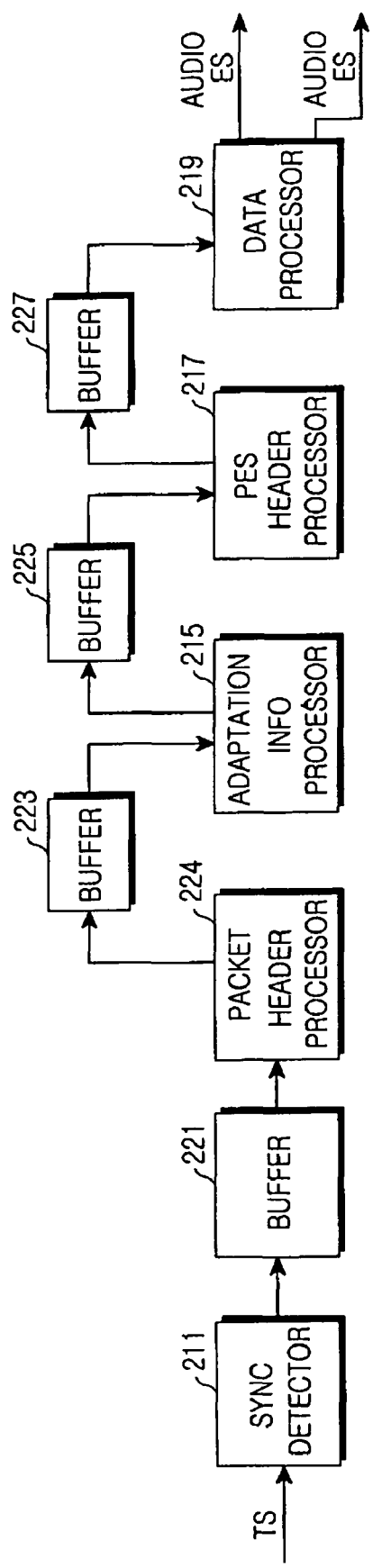
FIG. 3 is a block diagram illustrating a structure of a demultiplexer in a conventional digital broadcasting receiver.

Preferred embodiments of the present invention will be described in detail herein below with reference to the accompanying drawings. In the drawings, the same or similar elements are denoted by the same reference numerals even though they are depicted in different drawings.

To provide a better understanding of the present invention, specific details such as a Moving Picture Experts Group 2-Transport Stream (MPEG2-TS) data structure of a digital broadcasting receiver and so on will be described. Those skilled in the art will appreciate that the present invention can be readily implemented by making various known modifications, the specific details of which are readily understood.

An embodiment of the present invention relates to a demultiplexing apparatus and method that analyze packet data received in a digital broadcasting receiver before a decoding operation is performed in the digital broadcasting receiver and the distribution of the analyzed packet data to decoders. In the digital broadcasting receiver, the demultiplexing apparatus must be able to quickly perform a process because data must be analyzed and distributed in real time. It is preferred that a buffer memory is minimized in the intermediate step for performing a demultiplexing process. An embodiment of the present invention can reduce a process time by arranging processors of the demultiplexing apparatus in parallel and can minimize a mounting area by reducing a buffer size when they are mounted in a hardware chip. An embodiment of the present invention proposes a structure and method for buffering input data in a packet size, connecting the processors in parallel, analyzing buffered information in a packet unit, and quickly demultiplexing the input packet data.

An apparatus and method are proposed which can determine if synchronization is set without retrieving a sync byte from every byte when synchronization of the packet data is implemented and can transfer an input TS without modification if the synchronization is set. Moreover, the apparatus and method can acquire synchronization by identifying a sync position if the synchronization is not set, extracting a difference value, and delaying the input TS data according to the difference value.

In an embodiment of the present invention, it is assumed that a TS signal input to the digital broadcasting receiver is an MPEG2-TS signal. In accordance with an embodiment of the present invention, a demultiplexing structure may be applied in the same way, regardless of whether a TS signal conforms to the system standard of MPEG-4, or a video signal included as detailed data is based on one of H.261 to H.264 or MPEG-4 standards and an audio signal is based on one of MPEG-1 to MPEG-4 standards.

Hereinafter, preferred embodiments of the present invention are described with reference to the accompanying drawings.

Figure 5:
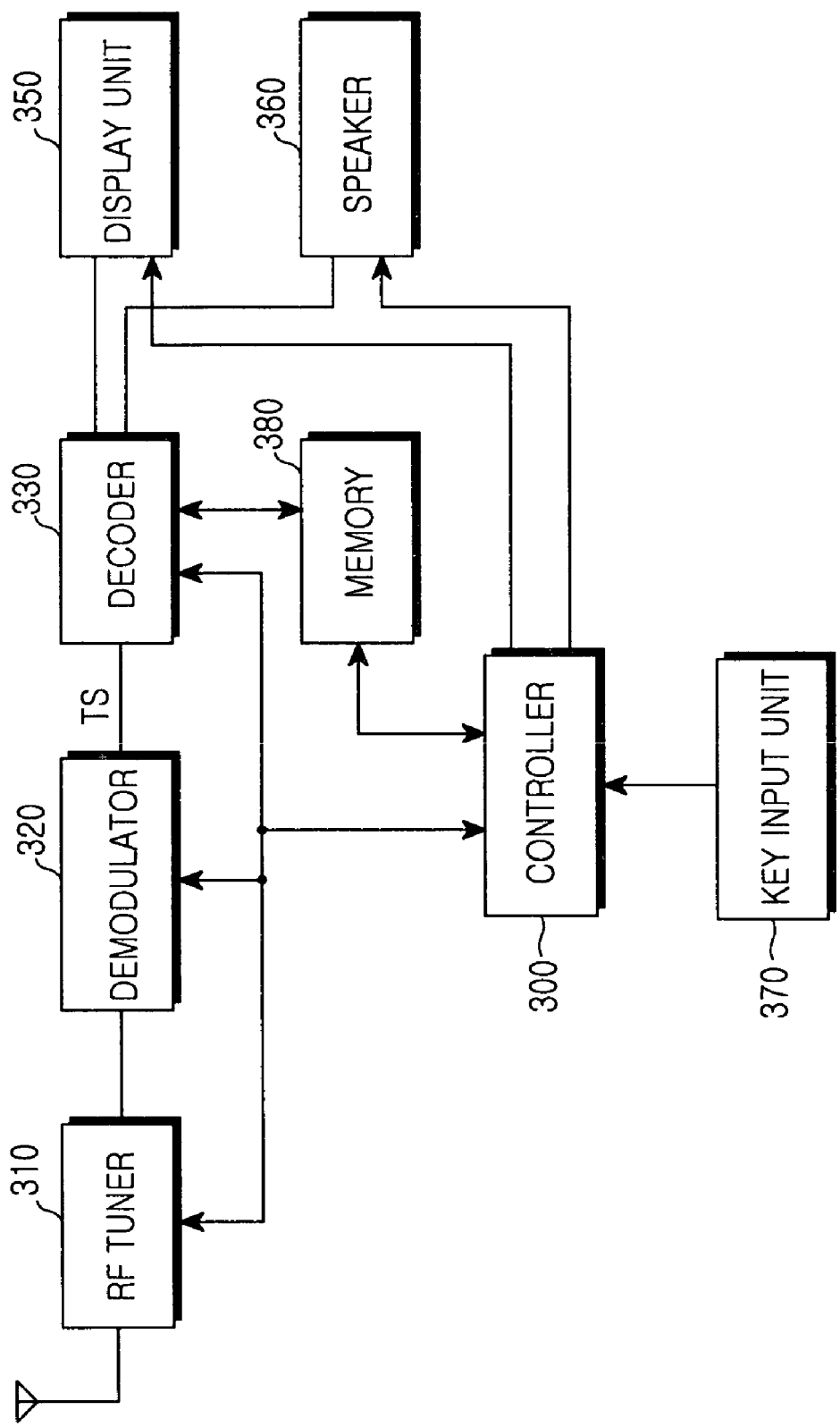
FIG. 5 is a block diagram illustrating a structure of a digital broadcasting receiver.

FIG. 5 is a block diagram illustrating a structure of a digital broadcasting receiver. As illustrated in FIG. 5, the digital broadcasting receiver has a structure provided with a controller 300, a Radio Frequency (RF) tuner 310, a demodulator 320, a multimedia processor/decoder 330, a display unit 350, a speaker 360, a key input unit 370, and a memory 380.

Referring to FIG. 5, a digital broadcasting signal may be a signal of a Very High Frequency (VHF) and/or Ultra High Frequency (UHF) domain and/or L-Band. A controller 300 outputs control data mapped to a channel selected in the RF tuner 310. The RF tuner 310 generates an intermediate frequency signal of the selected signal by generating and mixing an RF according to the channel data. The above-described intermediate frequency signal is applied to the demodulator 320. Then, the demodulator 320 converts a received signal to digital data, demodulates the digital data in a preset demodulation scheme, and outputs the demodulated data. Here, it is assumed that a signal output from the demodulator 320 is an MPEG-2 TS signal. This signal is applied to the multimedia processor 330. In an embodiment of the present invention, the RF tuner 310 and the demodulator 320 are referred to as a broadcasting receiver. Then, the multimedia processor 330 demultiplexes a received MPEG-2 TS signal and separates video, audio, and broadcasting information. Then, decoders of the multimedia processor 330 decode the video, audio, and broadcasting information, respectively. Then, a video signal output from the multimedia processor 330 is output and displayed on a display unit 350. An audio signal is applied to a speaker 360, such that the audio signal is reproduced. The broadcasting information of the multimedia processor 330 can be processed in the controller 300. In this case, the controller 300 receives and decodes the broadcasting information and stores the decoded information in a memory 380. When a user makes a channel information display request, the controller 300 accesses the broadcasting information and displays the accessed broadcasting information on the display unit 350. Here, the broadcasting information may be Electronic Program Guide (EPG) or Electronic Service Guide (ESG).

Next, a structure of the multimedia processor 330 in the digital broadcasting receiver will be described. The multimedia processor 330 can be differently configured according to type of the digital broadcasting receiver. In digital broadcasting based on a Digital Video Broadcasting (DVB) scheme, a Digital Video Broadcasting-Terrestrial (DVB-T) scheme processes data of an MPEG2 TS structure and a Digital Video Broadcasting-Handheld (DVB-H) scheme processes data of an IP-based MPEG2 TS structure. In the digital broadcasting receiver of the DVB-H scheme, the broadcasting receiver and the multimedia processor 330 must have a structure capable of processing IP-based MPEG2 TS data. A structure of the digital broadcasting receiver of the DVB-T scheme and a structure of the digital broadcasting receiver of the DVB-H scheme will be sequentially described with reference to embodiments of the present invention.

Figure 6:
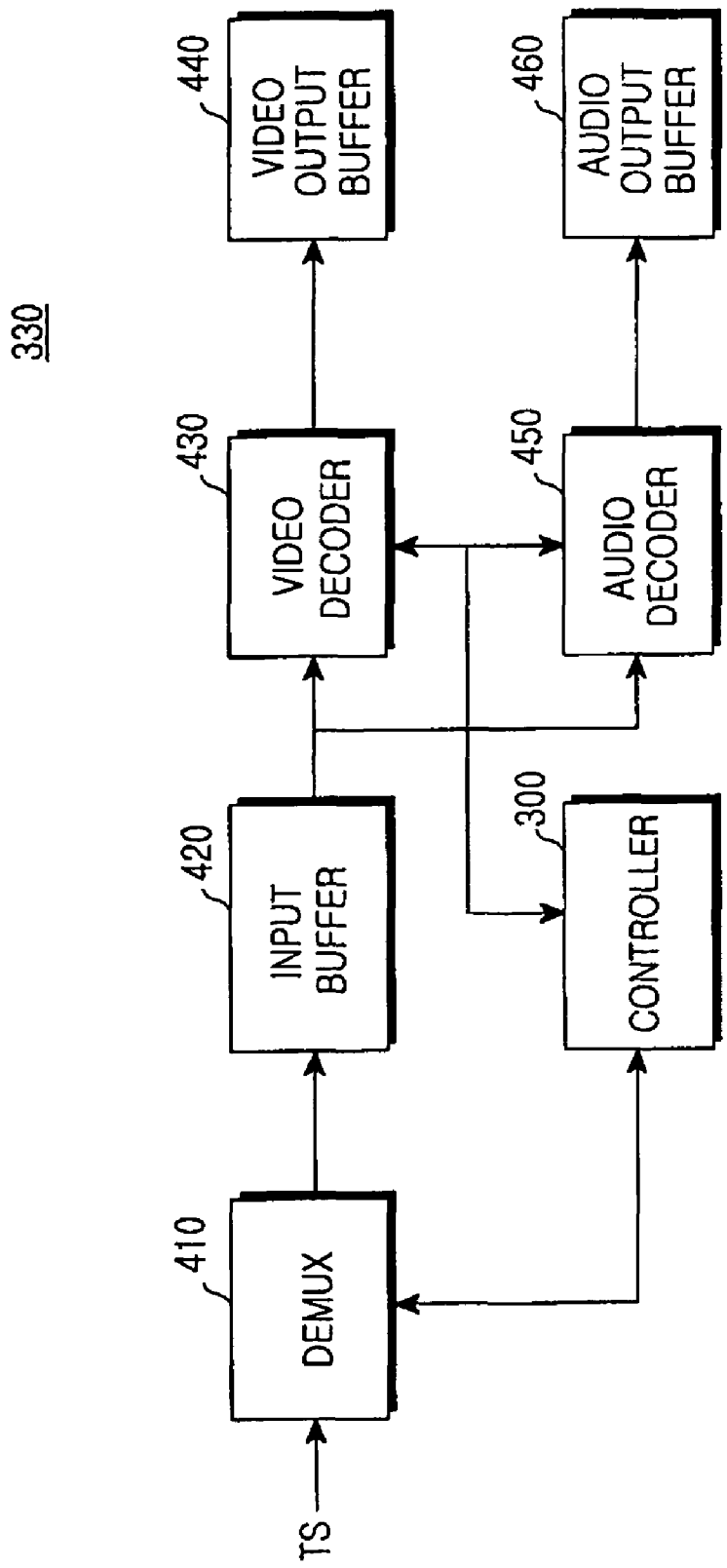
FIG. 6 is a block diagram illustrating a structure of a multimedia processor of FIG. 5.

FIG. 6 is a block diagram illustrating a structure of the multimedia processor 330. Here, FIG. 6 illustrates the structure of the multimedia processor 330 in the digital broadcasting receiver of the DVB-T scheme.

Referring to FIG. 6, a demultiplexer 410 performs a function for receiving demodulated MPEG-2 TS data output from the demodulator 320 and separating the data into audio data, video data, and broadcasting information. Here, the broadcasting information is data from which the video and audio data of a digital broadcasting signal are excluded, and may be program data of broadcasting service channels and so on. After the broadcasting information is separated in the demultiplexer 410, it can be applied to, and processed in, the controller 300 and can be stored in the memory 380 (FIG. 5). When the user makes a broadcasting information display request, the controller 300 can access the broadcasting information stored in the memory 380 and display the accessed information on the display unit 350. Hereinafter, a description of the broadcasting information is omitted. Accordingly, the broadcasting signal is limited to video and audio signals in the following description. The controller 300 selects and reports information about broadcasting to be selected in the demultiplexer 410, i.e., a service Product Identifier (PID), such that the demultiplexer 410 performs a function for selecting target data from various data output from the demodulator 320 according to the selected PID and separating the data into video and audio.

An input buffer 420 is a conventional queue (that is a type of a circular buffer in which an input and output are opposite to each other in a structure similar to a First-In First-Out (FIFO) structure). The input buffer 420 performs a function for storing demultiplexed real-time data corresponding to an amount of data capable of being processed in a video decoder 430 and an audio decoder 450 provided in a rear-end thereof. Here, the input buffer 420 can be configured in a single structure for storing video and audio data, or can be configured in a structure for dividing and storing video and audio data.

The video decoder 430 and the audio decoder 450 are responsible for decoding the video data and the audio data distributed from the demultiplexer 410, respectively.

In accordance with an embodiment of the present invention, the demultiplexer 410 detects synchronization of packet data input as described above, buffers the input packet data, and outputs the packet data in parallel when the packet data is completely buffered. In accordance with an embodiment of the present invention, the processors arranged in parallel analyze information of the output parallel packet data and process associated information.

Figure 7:
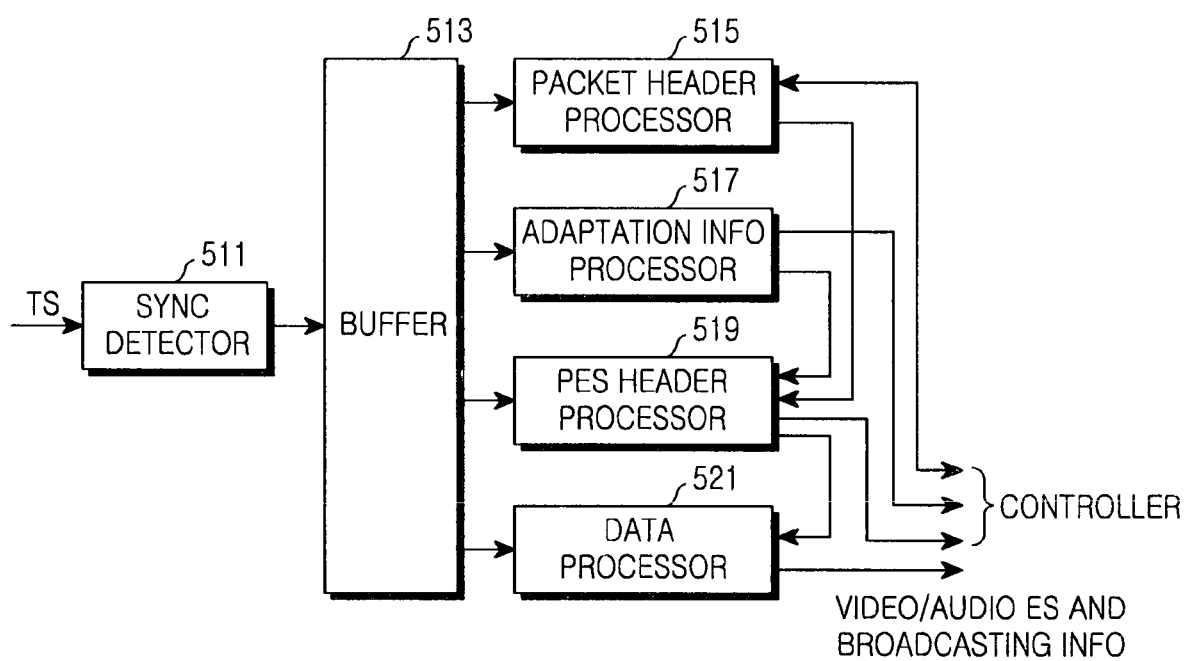
FIG. 7 is a block diagram illustrating a structure of a demultiplexer in the multimedia processor of the digital broadcasting receiver in accordance with the present invention.

FIG. 7 is a block diagram illustrating a structure of the demultiplexer 410 in accordance with an embodiment of the present invention.

Referring to FIG. 7, a sync detector 511 detects a sync signal included in packet data of an input TS signal, and transfers the input packet data to a buffer 513. In accordance with an embodiment of the present invention, the sync detector 511 sets synchronization using a delay scheme based on a difference value. The buffer 513 buffers serial data output from the sync detector 511 in a packet unit.

A packet header processor 515 retrieves a packet header from parallel packet data output by the buffer 513, determines if adaptation information is included, operates only a PES header processor 519 if the adaptation information is not included, and operates an adaptation information processor 517 if the adaptation information is included The packet header processor 515 analyzes the packet header from an input packet, transfers packet data except the packet header to the adaptation information processor 517 if the adaptation information is included, and transfers packet data except the packet header to the PES header processor 519 if the adaptation information is not included.

The adaptation information processor 517 operates under control of the packet header processor 515. When packet data is transferred from the packet header processor 515, the adaptation information processor 517 analyzes and processes the adaptation information included in the packet data, and transfers the remaining packet data except the adaptation information to the PES header processor 519.

The PES header processor 519 extracts and processes a PES header included in the packet data transferred from the packet header processor 515 or the adaptation information processor 517, and transfers the remaining packet data except the PES header to a data processor 521. At this time, the PES header processor 519 checks a PID of the PES header (for identifying audio or video data here), determines if the packet data is audio or video data, and reports a determination result to the data processor 521. The data processor 521 processes packet data from which the PES header is removed, and transfers the identified video or audio data to the input buffer 420 of the video decoder 430 or the audio decoder 450.

As described above, the demultiplexer 410 is provided with the four processors 515 to 521. The processors 515 to 521 sequentially analyze packet data buffered in the buffer 513, and access and process the packet data in the buffer 513 only when information to be processed in the associated processor is included in the packet data, respectively. At this time, a structure of the packet data can include a packet header, an adaptation information header, and/or a PES header. Accordingly, the processors 515 to 521 analyze data buffered in the buffer 513, and operate and process data only when a header to be processed in the associated processor is included, respectively. The data can be processed in parallel.

Before providing a description of the operation of the processors 515 to 521, a structure of the input MPEG2 TS signal will be described. The MPEG2 TS signal is a packet stream as described above. As illustrated in FIG. 8A, the TS signal is constructed by video and audio packets randomly multiplexed and transmitted from the digital broadcasting transmitter. In this case, the video and audio packets of FIG. 8A are constructed by a packet header and a payload as illustrated in FIG. 8B, respectively. The packet header and the payload have 188 bytes. That is, one-packet data is constructed by 188 bytes. The packet header has a size of 4 bytes as illustrated in FIG. 8C, and parameters of the packet header have functions as shown in Table 1.

TABLE 1

| Class | Description | Bits |
|---|---|---|
| Sync byte | The sync byte has a value of 0X47 | 8 |
| Transport error indicator | When the indicator is set to '1', it indicates an error in the current packet. | 1 |
| Payload start indicator | When the indicator is set to '1', it indicates that the current packet is the PES start. | 1 |
| Transport priority | This is used in a decoder. | 1 |
| PID | This is an identifier for identifying a packet type. | 13 |
| Scrambling control | This indicates scrambling mode. | 2 |
| Adaptation field control | 01: No adaptation info/Payload only<br>10: Adaptation info only/No payload<br>11: Adaptation info followed by a payload<br>00: Reserved | 2 |
| Continuity counter | This is a 4-byte counter and is incremented by one for the same PID. | 4 |

That is, packet data starts with a sync byte, and one packet is identified on the basis of the sync byte. The sync detector 511 retrieves input packet data and delays a data input until the sync byte is detected. When the sync byte is detected, the sync detector 511 enables the buffer 513 to buffer subsequently input packet data. Then, the buffer 513 buffers the input packet data. At this time, the buffer 513 may be a 188-byte buffer with a packet size or a buffer with a size of an integer multiple of the packet size (i.e., 376 bytes (=2*188 bytes), 564 bytes (=3*188 bytes), and so on). As shown in Table 1, the 4-byte packet header is buffered in a position of the first to fourth bytes of the buffer 513.

Then, the packet header processor 515 processes the packet header as shown in FIG. 8C and Table 1. The packet header processor 515 compares a PID of a broadcasting channel set by the user (hereinafter, referred to as a set PID) with a PID of the packet header, and determines if a received packet needs to be processed. If the packet has a PID different from the set PID, a control operation is performed such that the packet buffered in the buffer 513 is not processed. However, if the packet buffered in the buffer 513 has the same value as that of the set PID, the packet header processor 515 analyzes the packet header and determines if an adaptation field control parameter is included. When the packet (constructed by a PES header and/or Audio/Video (A/V) data) does not include the adaptation information after the adaptation field control parameter of the packet header is analyzed, a control operation is performed such that the operation of the adaptation information processor 517 is omitted and packet data stored in the buffer 513 is transferred to the PES header processor 519.

When the packet does not include the adaptation information, the PES header and/or A/V data are stored in a payload field with the structure of FIG. 8C. However, when the adaptation information is included in the packet data, it has a packet data structure as illustrated in FIG. 8C. At this time, the adaptation information (or the adaptation information, the PES header, and/or the A/V data) can be included in the payload field. Then, the packet header processor 515 controls the adaptation information processor 517 such that payload data buffered in the buffer 513 can be processed. At this time, information transferred to the adaptation information processor is position information of the buffer 513 in which the adaptation information is buffered, and may be information about a position of the next byte except the 4 bytes of the packet header to a position of the last byte in which the last data of the adaptation information is buffered.

The adaptation information processor 517 operates under the control of the packet header processor 515. The adaptation information processor 517 processes the adaptation information present in the payload field of FIG. 8C. The adaptation information has a structure as illustrated in FIGS. 9A to 9C. FIG. 9A illustrates a structure of an adaptation information header. The adaptation information has information about an adaptation field length, an ES priority indicator, and so on, and has parameters of 5 flags indicating if Optional Field 1 of the adaptation field is included. If Optional Field 1 of the adaptation field is included, at least one flag is set in a 5-flag field as illustrated in FIG. 9A. Adaptation information mapped to the set flag is included in Optional Field 1 of the adaptation field of FIG. 9A. The adaptation information included in Optional Field 1 is shown in Table 2 and its structure can be constructed as shown in FIG. 9B.

TABLE 2

| Five flags | Optional Field 1 | Bits |
|---|---|---|
| 1XXXX | PCR | 42 bits |
| X1XXX | OPCR | 42 bits |
| XX1XX | Splice countdown | 8 bits |
| XXX1X | Transport private data length | 8 bits |
|  | Transport private data | Variable |
| XXXX1 | Adaptation field extension length | 8 bits |

Referring to FIG. 9B, Optional Field 1 of the adaptation field includes a Program Clock Reference (PCR) corresponding to a reference value of program time information and is constructed by adaptation information capable of being used for decoding. Table 2 shows data of Optional Field 1 of the adaptation field mapped to the 5 flags. Here, two or more flags or all of the 5 flags may be set. For example, when the 5 flags are set to "10100", the PCR and splice countdown data can be included in Optional Field 1 of the adaptation field.

Moreover, Optional Field 1 of the adaptation field as illustrated in FIG. 9B includes 3 flags indicating if data of Optional Field 2 of the adaptation field is included. When Optional Field 2 of the adaptation field is included, the 3 flags are set and the adaptation information is included in Optional Field 2. Optional Field 2 has a structure as illustrated in FIG. 9C. The adaptation information included in Optional Field 2 is shown in Table 3. Table 3 shows data of Optional Field 2 of the adaptation field mapped to the 3 flags. Here, at least two flags of the 3 flags can be set.

TABLE 3

| Three flags | Optional Field 2 | Bits |
|---|---|---|
| 1XX | LTW_Valid flag | 1 bit |
|  | LTW offset | 15 bits |
| X1X | Piecewise rate | 22 bits |
| XX1 | Splice type | 4 bits |

FIGS. 9A to 9C illustrate adaptation information for decoding received packet data that is included if needed.

The operation of the PES header processor 519 will now be described.

Figure 10C:
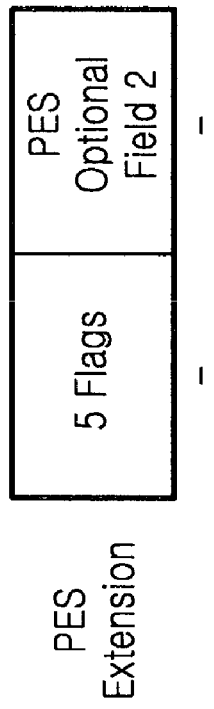

After the packet header processor 515 determines that a packet does not include the adaptation information or the adaptation information processor 517 processes the adaptation information, the remaining packets are processed in the PES header processor 519 and/or the data processor 521 under the control of the packet header processor 515 or the adaptation information processor 517. The PES header processor 519 processes PES header information as illustrated in FIGS. 10A to 10D. FIG. 10A illustrates a PES header structure constructed by a PES scrambling control field, a PES priority field, a copyright field, an original/copy field, a 7-flag field, a PES data length field, and so on. PES Optional Field 1 is added if needed.

FIG. 10B illustrates a structure of Optional Field 1 that includes a Presentation Time Stamp (PTS)/Decoding Time Stamp (DTS). The PTS is time information for displaying data decoded by the video decoder 430 or the audio decoder 450 on the display unit 350. At the time of the PTS, the display unit 350 outputs the data decoded by the decoder. The DTS is time information for starting decoding in the video decoder 430 or the audio decoder 450. The decoder starts to decode input packet data at the time of the DTS. Table 4 shows 7 flags of the PES header and data of PES Optional Field 1 as illustrated in FIG. 10A.

TABLE 4

| Seven flags | PES Optional Field 1 | Bits |
| --- | --- | --- |
| 0XXXXXX | PTS | 33 bits |
| 1XXXXXX | DTS | 33 bits |
| X1XXXXX | ESCR | 42 bits |
| XX1XXXX | ES rate | 22 bits |
| XXX1XXX | DSM trick mode | 22 bits |
| XXXX1XX | Additional copy info | 8 bits |
| XXXXX1X | Previous PES CRC | 16 bits |
| XXXXXX1 | PES extension | Variable length |

Figure 10D:
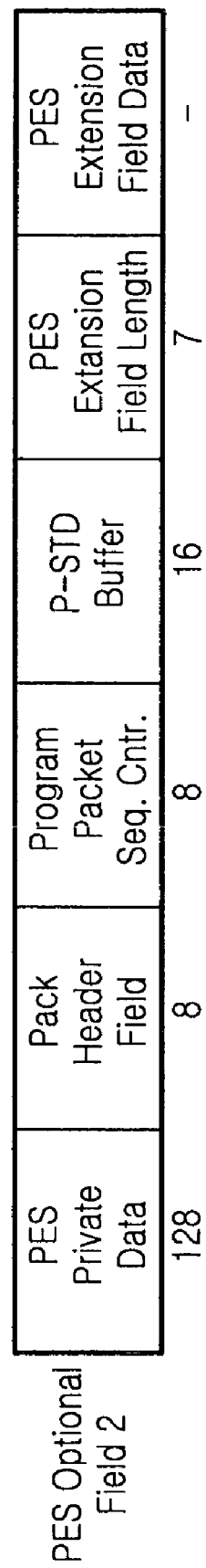

As illustrated in FIG. 10B, PES Optional Field 1 can further include PES extension information if needed. FIG. 10C illustrates a structure of the PES extension information that can further include 5 flags and PES Optional Field 2, if needed. FIG. 10D illustrates a structure of Optional Field 2 that is set by the 5 flags of the PES extension information as illustrated in FIG. 10C. The 5 flags determine subsequent content of PES Optional Field 2. The 5 flags are shown in Table 5.

TABLE 5

| Five flags | PES Optional Field 2 | Bits |
| --- | --- | --- |
| 1XXXX | PES private data | 128 bits |
| X1XXX | Pack header field | 8 bits |
| XX1XX | Program packet sequence counter | 8 bits |
| XXX1X | PES extension field length | 16 bits |
| XXXX1 | PES extension field data | 7 bits |

The PES header processor 519 processes the PES header with the structure as illustrated in FIGS. 10A to 10D, and transfers position information of A/V data except the PES header to the data processor 521. At this time, the A/V data transferred to the data processor 521 is an ES corresponding to true data from which header information included in the packet data is removed. The data processor 521 performs a function for distributing the transferred A/V data in the form of a video or audio ES signal.

In accordance with the embodiment of the present invention as described above, the demultiplexer 410 can quickly perform a demultiplexing operation because the buffer 513 buffers and outputs input TS signals in a packet size in parallel and the processors 515 to 521 access and analyze parallel packet information, arranged in the buffer 513 as illustrated in FIG. 7, in parallel. In accordance with the present invention, the sync detector 511 of the demultiplexer 410 can simplify sync detection by delaying data input to the buffer 513 by an identified delay value after identifying the delay value of a sync byte at the time of identifying the sync byte, without retrieving every byte of input packet data when synchronization of the input packet data is detected.

The operation of the demultiplexer 410 of FIG. 7 in accordance with the embodiment of the present invention will be described in more detail with reference to packet data of FIGS. 8A to 10D.

Figure 4:
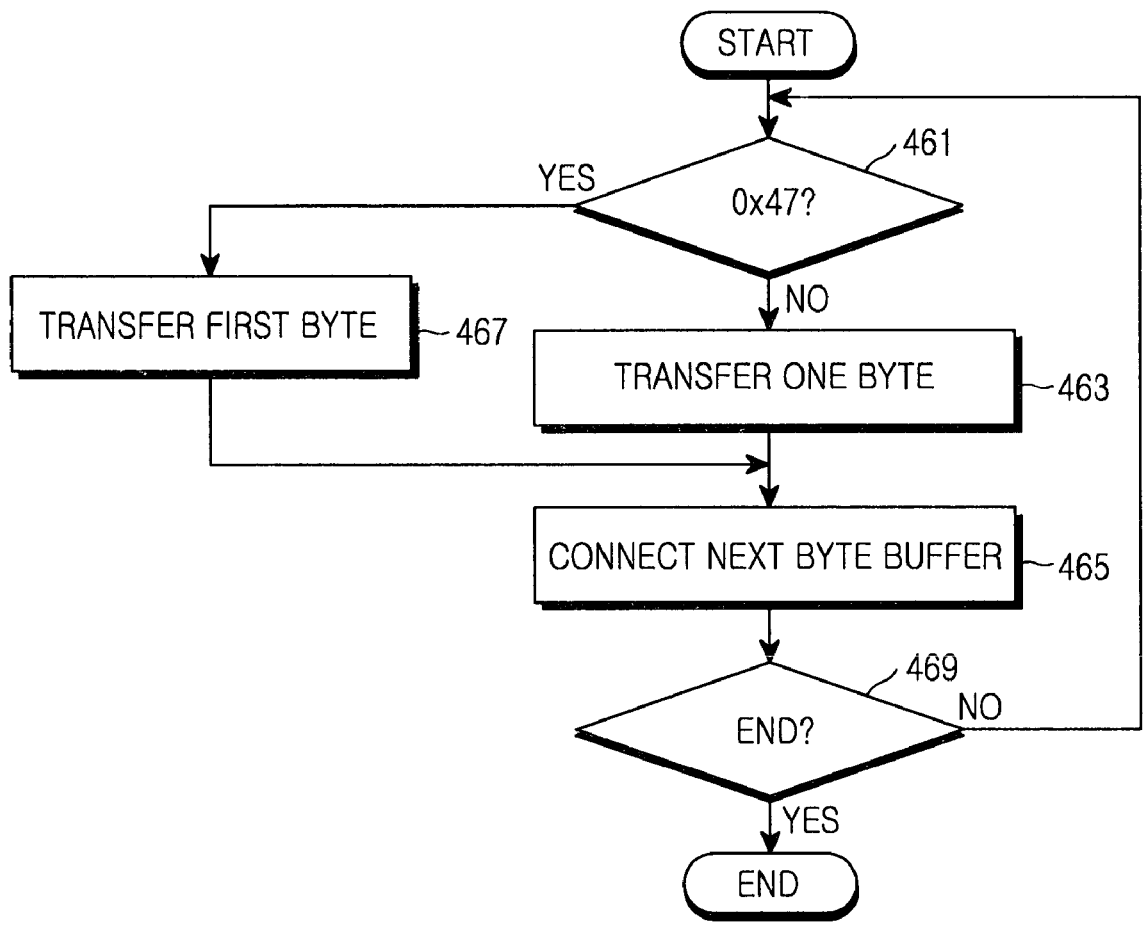
FIG. 4 is a flowchart illustrating a procedure for detecting a sync signal in the demultiplexer of FIG. 3.
Figure 11:
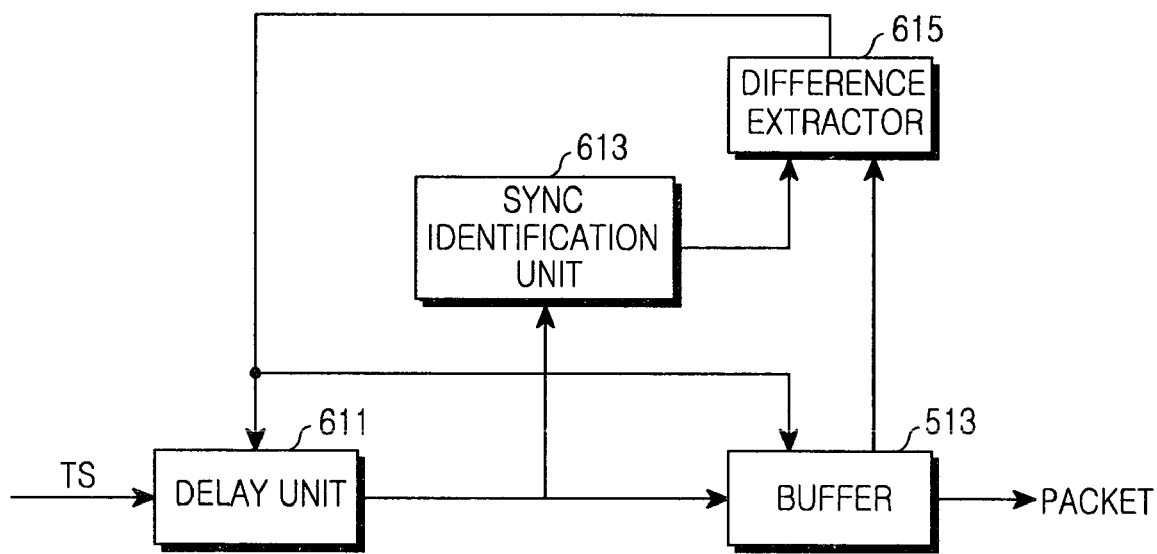
FIG. 11 is a block diagram illustrating a structure of a sync detector of FIG. 7 in accordance with an embodiment of the present invention.

FIG. 11 illustrates the sync detector 511 of the demultiplexer 410 in accordance with an embodiment of the present invention. A sync detection method proposed in the MPEG standard must determine if every byte of input packet data is a sync byte of 0X47, as described with reference to FIG. 4. In accordance with an embodiment of the present invention, the buffer 513 stores an input TS signal in a packet size, and byte data stored in the buffer 513 is checked. When the byte data is a sync byte, the sync detector 511 detects a value of a position out of a sync byte position of the buffer 513 and sets packet synchronization. That is, when the sync byte is identified, the sync detector 511 detects a position value of the buffer 513 in which the identified sync byte is stored on the basis of a specific position of the buffer 513 (assumed as the first byte position here), computes a difference value between the position of the identified sync byte and a set sync byte buffering position, and acquires synchronization by delaying bytes of the input TS signal by the computed difference value.

Referring to FIG. 11, the input packet data is stored in the buffer 513. Here, the buffer 513 serving as a buffer for storing the packet data has a size of 188 bytes and stores byte data of the input packet in input order. At this time, a difference extractor 615 identifies position information of byte data buffered in the buffer 513. A sync identification unit 613 determines if byte data stored in the buffer 513 is a sync byte. When the sync byte is identified, the sync identification unit 613 reports an identification result to the difference extractor 615. When a signal for identifying the sync byte is received from the sync identification unit 613, the difference extractor 615 identifies a position for buffering the current byte of the buffer 513 (corresponding to the sync byte). Then, the difference extractor 615 computes a difference value between a position of the buffer 513 in which byte data identified as the sync byte is stored and a position for buffering a sync byte set in the buffer 513, and outputs the computed difference value to a delay unit 611. Then, the delay unit 611 delays the input TS signal by the computed difference value and transfers the TS signal to the buffer 513 after delaying the input TS signal by the difference value. At this time, the buffer 513 stops an operation for storing the TS signal for a delay time based on the difference value output from the difference extractor 615. When the delay time based on the difference value has elapsed, the buffer 513 buffers the TS signal transferred from the delay unit 611. Accordingly, the sync detector 511 normally transfers the input TS signal to the buffer 513. The transferred TS signal is data starting from the sync byte of the packet.

Once synchronization of the packet is achieved as described above, packets of a subsequently input TS signal are in a synchronization state. As long as some special obstacle does not occur, the synchronization state is continuously maintained. When the packet synchronization is wrong due to the obstacle state, it is achieved by again performing the above-described operation. In accordance with the embodiment of the present invention as described above, the sync detector 511 uses a method for implementing synchronization by identifying a sync byte position of a packet from an input TS signal, computing a difference value according to the sync byte position, and delaying input packet data by the computed difference value.

Figure 12:
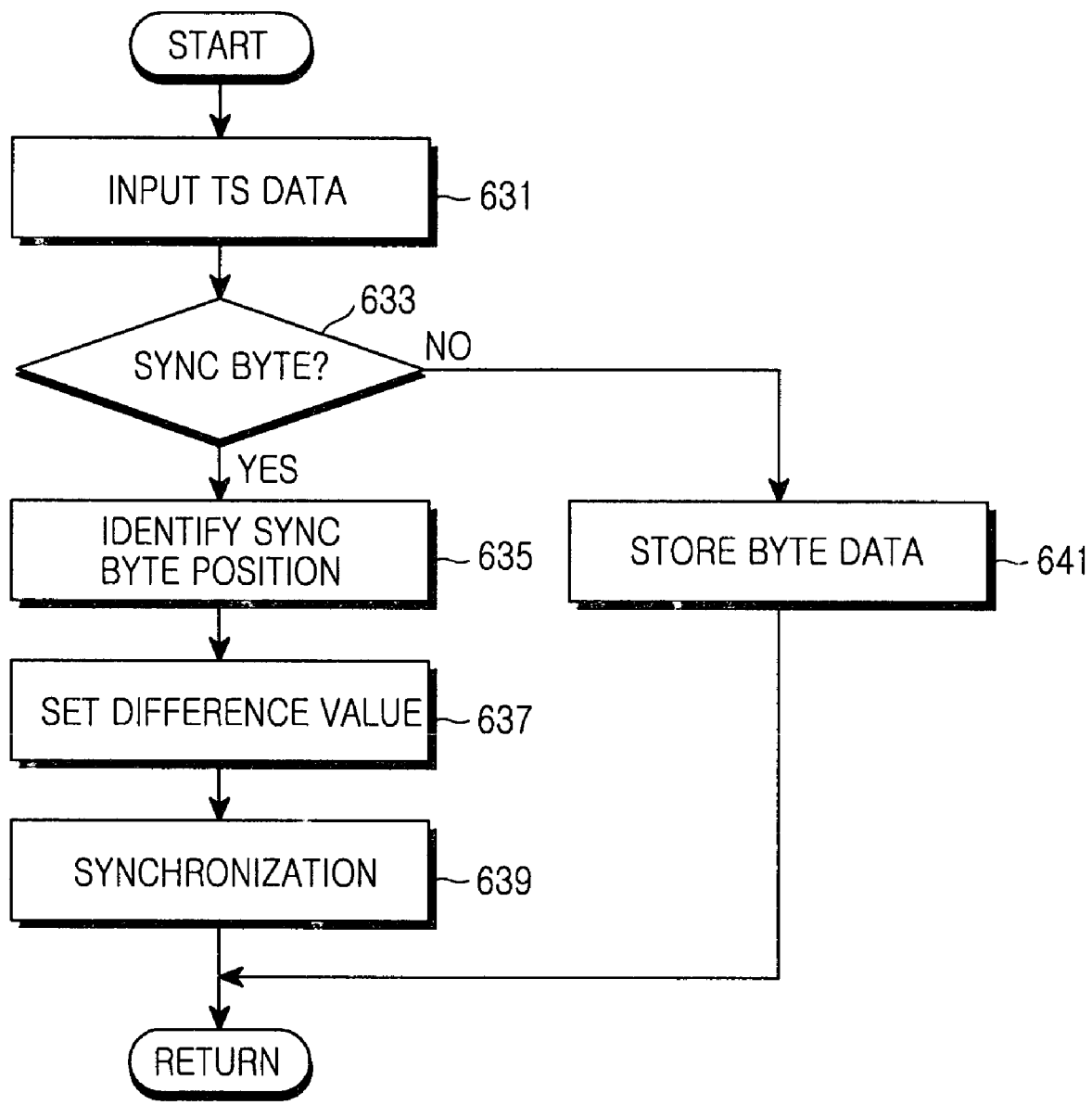
FIG. 12 is a flowchart illustrating a procedure for detecting a sync signal in the sync detector of FIG. 11.

FIG. 12 is a flowchart illustrating a procedure for performing the operation of the sync detector 511.

Referring to FIG. 12, the TS signal is a packet stream in which one packet is constructed by 188 bytes. The TS signal is sequentially input to the buffer 513 through a byte bus in a byte unit. When the TS signal is input in step 631, the sync detector 511 determines if input byte data is sync byte data. If the input byte data is not sync byte data, the buffer 513 stores the input byte data in step 641. At this time, the buffer 513 sequentially stores the input byte data. When a sync byte is input, the sync detector 511 detects the input sync byte in step 633, identifies a position of the buffer 513 in which the sync byte is stored in step 635, compares the identified position with a preset sync byte position to set a position difference value in step 637, and sets synchronization of a packet by delaying a data input to be stored in the buffer 513 in step 639.

For example, first packet data may be input in a state in which packet synchronization is not achieved. Then, the sync detector 511 stores byte data of the input packet in the buffer 513 without modification. Then, the sync detector 511 determines if the byte data stored in the buffer 513 is sync data. When the sync data is identified, a position of the buffer 513 in which the sync byte is stored is identified. Then, the sync detector 511 sets a difference value associated with the sync byte for the packet synchronization. At this time, it is assumed that a position set for the sync byte is a first byte position of the buffer 513. When a current sync byte position is identified as a $180^{th}$ byte position, the difference value is −8. Then, the sync detector 511 delays the input packet data by 8 bytes and inputs the delayed packet data to the buffer 513, thereby achieving packet synchronization. In this case, the packet synchronization is achieved after the 8 bytes are lost. When the packet synchronization is wrong, the sync detector 511 can achieve synchronization in the next packet period.

Once the packet synchronization is set, it is maintained as long as an error does not occur on a radio link. The sync detector 511 maintains the difference value as 0 in a state in which the packet synchronization is achieved. The sync detector 511 performs a control operation such that the buffer 513 can buffer input packet data in a packet unit. In the embodiment of the present invention, it can be seen that the sync detector 511 achieves packet synchronization by detecting synchronization of a first byte of a synchronized packet according to a difference value for a sync byte in a packet interval without retrieving a sync byte from every byte of an input packet. When a packet header is processed, the packet header processor 515 determines if the first byte is the sync byte. If the first byte is not the sync byte, the packet header processor 515 can notify the sync detector 511 that synchronization is wrong. Then, the sync detector 511 can set synchronization of an input packet while performing the above-described operation.

Figure 13A:
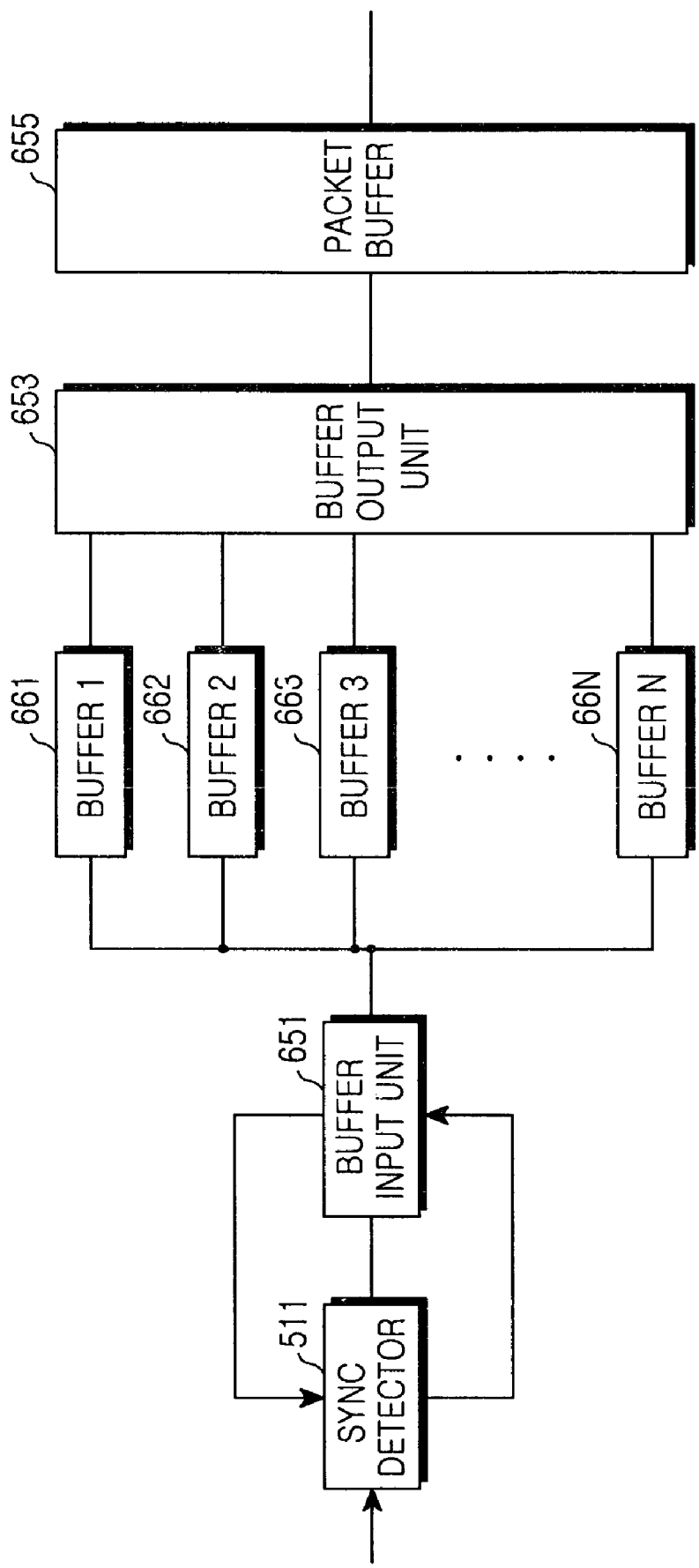
FIGS. 13A to 13C illustrate a structure of an input buffer of FIG. 7 in accordance with the present invention.
Figure 13B:
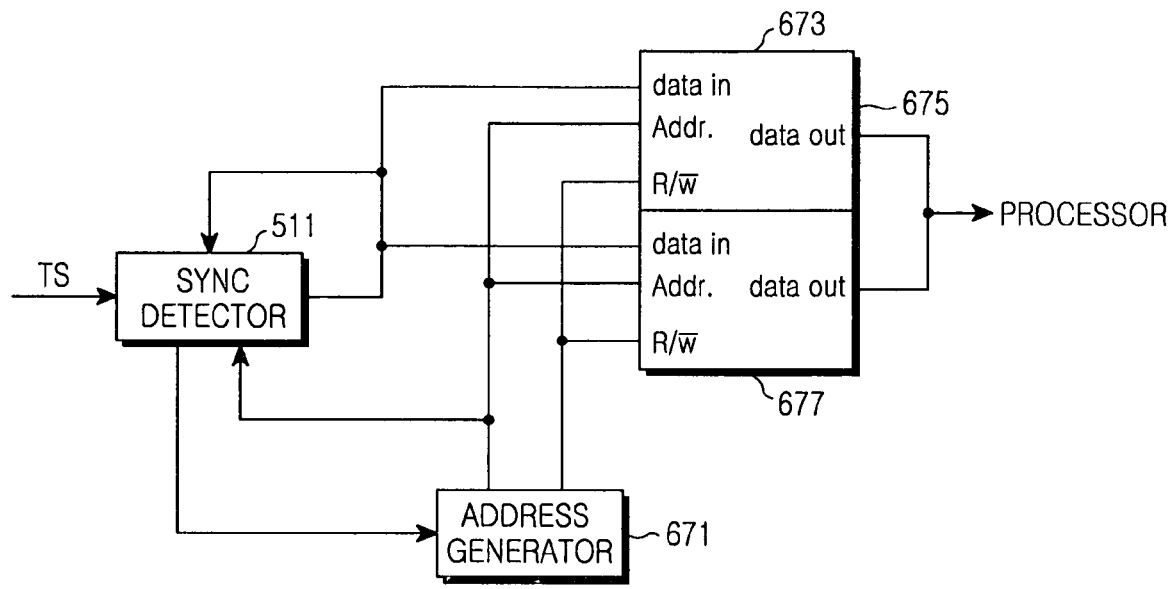
Figure 13C:
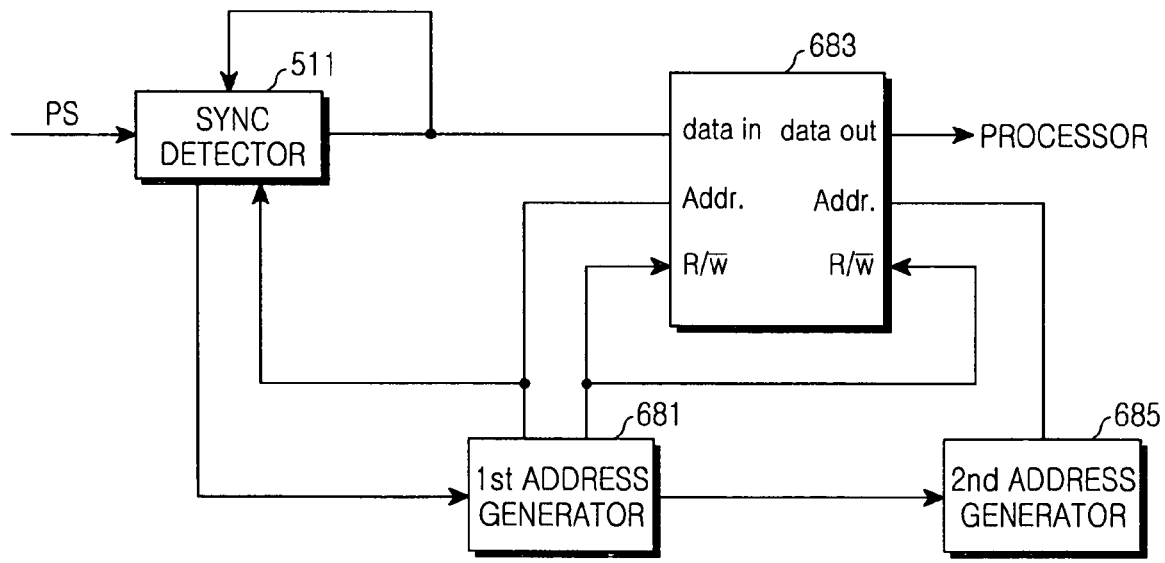

FIGS. 13A to 13C illustrate a structure of the buffer 513 in accordance with an embodiment of the present invention.

Here, FIG. 13A illustrates a structure for buffering an input TS signal in a packet size and outputting buffered packet data in parallel. In this case, the processors 515 to 521 can simultaneously access 188 bytes output from the buffer 513 in parallel. The processors 515 to 521 can simultaneously access the data buffered in the buffer 513. FIG. 13B illustrates an example of implementing the buffer 513 using two buffers 675 and 677. If the buffer 513 is implemented as illustrated in FIG. 13B, the processors 515 to 521 access and process data buffered in the buffer 677 when a TS packet is buffered in the buffer 675. Then, the processors 515 to 521 access and process a packet buffered in the buffer 675 when the input TS packet is buffered in the buffer 677. FIG. 13C illustrates an example of implementing a memory of the buffer 513 with a dual port memory 683. In this case, an operation for buffering input TS packets in the memory 683 and an operation for accessing the buffered packets in the processors 515 to 521 can be independently implemented.

Referring to FIG. 13A, a buffer input unit 651 performs an operation for distributing and inputting the input packet data to buffers 661 to 66N in a byte unit. The buffer input unit 651 can be configured by a counter and a multiplexer. A count value of the counter of the buffer input unit 651 can be used as data for selecting the buffers 661 to 66N. The multiplexer can perform a function for outputting byte data of the input packet to the buffers 661 to 66N in response to the count value. At this time, the buffers 661 to 66N must be provided such that 188-byte data of one packet can be buffered. Accordingly, N may be 188. The counter of the buffer input unit 651 may be a 188-ary counter. The multiplexer can have a structure capable of multiplexing byte data of the input packet for the 188 buffers 661 to 66N. The count value of the buffer input unit 651 serving as a position value of a sync byte can be applied to the difference extractor 615 of the sync detector 511. Packet data input to the multiplexer can be used as an input of the sync identification unit 613. A signal output from the input delay unit 611 can be used as a count reset value of the counter of the buffer input unit 651.

As described above, the buffer input unit 651 multiplexes byte data of an input packet and inputs the multiplexed byte data to the buffers 661 to 66N. The buffers 661 to 66N temporarily buffer the input byte data. A buffer output unit 653 performs a parallel buffering operation on the data buffered in the buffers 661 to 66N. When the buffered data reaches 188-byte data, the buffer output unit 653 outputs one-packet data buffered in parallel to a packet buffer 655. At this time, an output control signal of the buffer output unit 653 can use a count end signal of the counter of the buffer input unit 651. Then, the packet buffer 655 buffers the parallel data of the one packet output from the buffer output unit 653. The buffers 661 to 66N start to buffer byte data of the next packet according to the buffer input unit 651. Accordingly, a difference of one packet occurs between packets buffered in the buffers 661 to 66N and the packet buffer 655. Then, the processors 515 to 521 can process packet data buffered in the packet buffer 655 while an input packet is buffered in the buffers 661 to 66N. Using the buffer 513 as illustrated in FIG. 13A, the processors 515 to 521 can simultaneously access and process buffered data of one packet output in parallel.

Referring to FIG. 13B, a buffer memory 673 can store two packets. For this, the first buffer 675 and the second buffer 677 can be provided. While the input packet is buffered in the first buffer 675, the processors 515 to 521 access and process the packet buffered in the second buffer 677. Subsequently, while the input packet is buffered in the second buffer 677, the processors 515 to 521 access and process the packet buffered in the first buffer 675. At this time, the first buffer 675 and the second buffer 677 are configured such that a data input and a data output can be independently used. A line of the data input is connected to the sync detector 511 and a line of the data output is connected to the processors 515 and 517.

An address generator 671 for generating address and control signals to buffer or output data of the buffers 675 and 677 can be implemented with a counter. A read/write terminal can use the Most Significant Bit (MSB) output of the counter. A count clock of the address generator 671 uses a byte clock of the input TS signal. Accordingly, the address generator 671 performs a function for generating an address signal to store byte data, output from the sync detector 511, in the buffer memory 673. At this time, the address generator 671 has a 9-bit output. The least significant 8-bit line generates an output of the 188-ary counter, and the most significant 9-bit (MSB) line uses a read/write control signal for the buffers 675 and 677. A design is made such that the MBS line is maintained in a low state while the address generator 671 operates as the first 188-ary counter and the MSB line is maintained in a high state while the address generator 671 operates as the second 188-ary counter. While odd packets of the TS signal are buffered in the first buffer 675, the processors 515 to 521 access even packets buffered in the second buffer 677. While even packets of the TS signal are buffered in the second buffer 677, the processors 515 to 521 access even packets buffered in the first buffer 675.

The least significant 8-bit line output from the address generator 671 is connected to the difference extractor 615 of the sync detector 511. An output of the difference extractor 615 is input as a reset signal of the address generator 671. Then, the difference extractor 615 receives an address value of the address generator 671. When the sync identification unit 613 identifies a sync byte input, the address value indicates information about a position in which the sync byte is stored in the buffer memory 673. Then, the difference extractor 615 computes a value of a position in which the sync byte is to be buffered in the current buffering position in which the sync byte is stored. The difference extractor 616 stops the operation of the delay unit 611 and the address generator 671 according to a computed difference value. Then, the address generator 671 stops an addressing operation for the buffer memory 673.

A system as illustrated in FIG. 13B includes two buffer memories with a packet size, and performs a control operation such that the processors 515 to 521 performs a process when one buffer memory buffers an input packet and the other buffer memory outputs a buffered packet. At this time, write and read addressing operations for the buffer memories are performed at the same rate.

Referring to FIG. 13C, the buffer memory 683 tray be a dual port memory. When the dual port memory is used for the buffer memory 683, a first address generator 681 and a second address generator 685 can generate addresses at different rates. That is, the first address generator 681 performs an addressing operation at a rate at which input byte data can be stored, and the second address generator 685 performs an addressing operation at a rate at which the processors 515 to 521 can perform a process. At this time, an addressing start time-point of the second address generator 685 must match that of the first address generator 681. This is because an output time of a buffered packet must be set on the basis of a buffering time of one packet in the buffer memory 683. Accordingly, count clocks for addressing of the first address generator 681 and the second address generator 685 can be used at different rates. A count-reset operation of the second address generator 685 is configured such that it is performed according to the first address generator 681. The operations of the first address generator 681 and the sync detector 511 may be implemented in the same way that the operations of the address generator 671 and the sync detector 511 of FIG. 13B are implemented.

In a state in which the buffer 513 buffers packet data in parallel, the processors 515 to 521 analyze associated header information in the buffered packet data, analyze and process the packet data, extract an audio or video ES and output a demultiplexed audio or video ES to the audio decoder 450 or the video decoder 430. At this time, the header information processed in the processors 515 to 521 is transferred to the controller 300, such that the processed header information is used as control information for processing digital broadcasting.

In accordance with an embodiment of the present invention, the packet header processor 515 analyzes a packet header from a packet buffered in the buffer 513, and determines if adaptation information is included. If the adaptation information is not included, the packet header processor 515 outputs a packet process command to the PES header processor 519 and also sends position information of the buffer 513 to be processed in the PES header processor 519. That is, the packet header processor 515 generates a command for processing $5^{th}$ to $188^{th}$ bytes from which a 4-byte packet header is excluded. When data buffered in the buffer 513 is packet data including only the adaptation information, the packet header processor 515 issues, to the adaptation information processor 517, a command for processing the $5^{th}$ to $188^{th}$ bytes from which the 4-byte packet header is excluded. Alternatively, when data buffered in the buffer 513 is packet data including only the adaptation information, the packet header processor 515 notifies the adaptation information processor 517 that the packet includes the adaptation information and the PES header and also issues a command for processing the adaptation information to the adaptation information processor 517. At this time, the packet header processor 515 can command the PES header processor 519 to prepare to process the PES header. Then, the adaptation information processor 517 identifies a length of the PES header and the adaptation information included in the packet, and notifies the packet header processor 515 or the PES header processor 519 of the PES header length. When receiving a process command from the packet header processor 515 or the adaptation information processor 517, the PES header processor 519 analyzes the PES header associated with the transferred data buffered in a position of the buffer 513, transfers, to the data processor 521, information about a position in which the data is actually buffered according to an analysis result, and processes the PES header. In response to PID information transferred from the controller 300, the data processor 521 generates audio or video ES data from the buffered data associated with the position information transferred from the PES header processor 519, demultiplexes the audio or video ES data, and outputs the demultiplexed audio or video ES data to the video decoder 430 or the audio decoder 450.

Alternatively, the controller 300 may analyze and process the packet header, the adaptation information header, and the PES header. After analyzing the header information (of the packet header, the adaptation information header, and the PES header) of a packet, the controller 300 processes packet data stored in the buffer 513 in parallel while controlling the processors 515 to 521 in parallel according to a result of analyzing the header information.

Figure 14A:
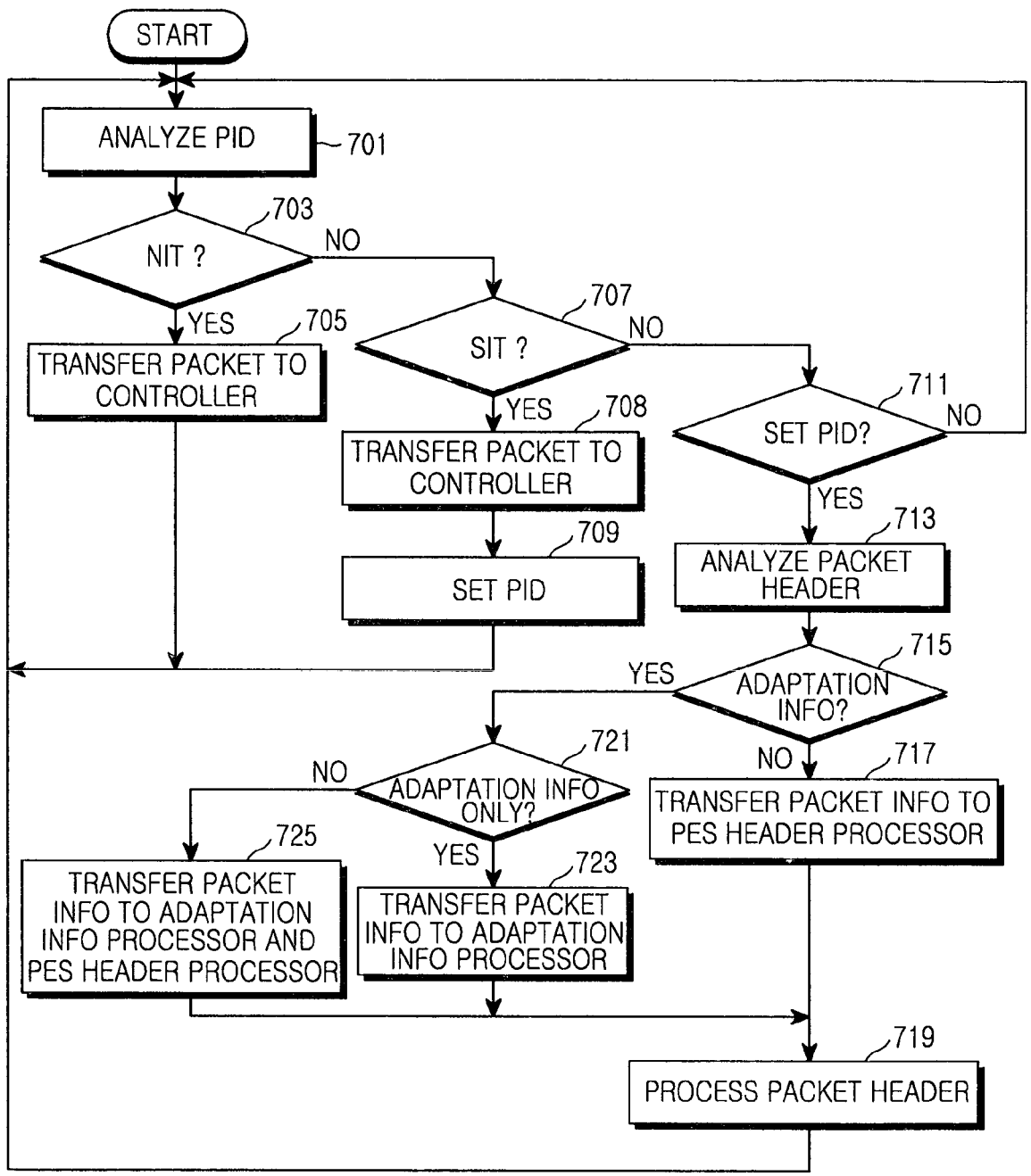
FIGS. 14A and 14B are flowcharts illustrating a procedure for processing a packet header in a packet header processor of FIG. 7 in accordance with the present invention.
Figure 14B:
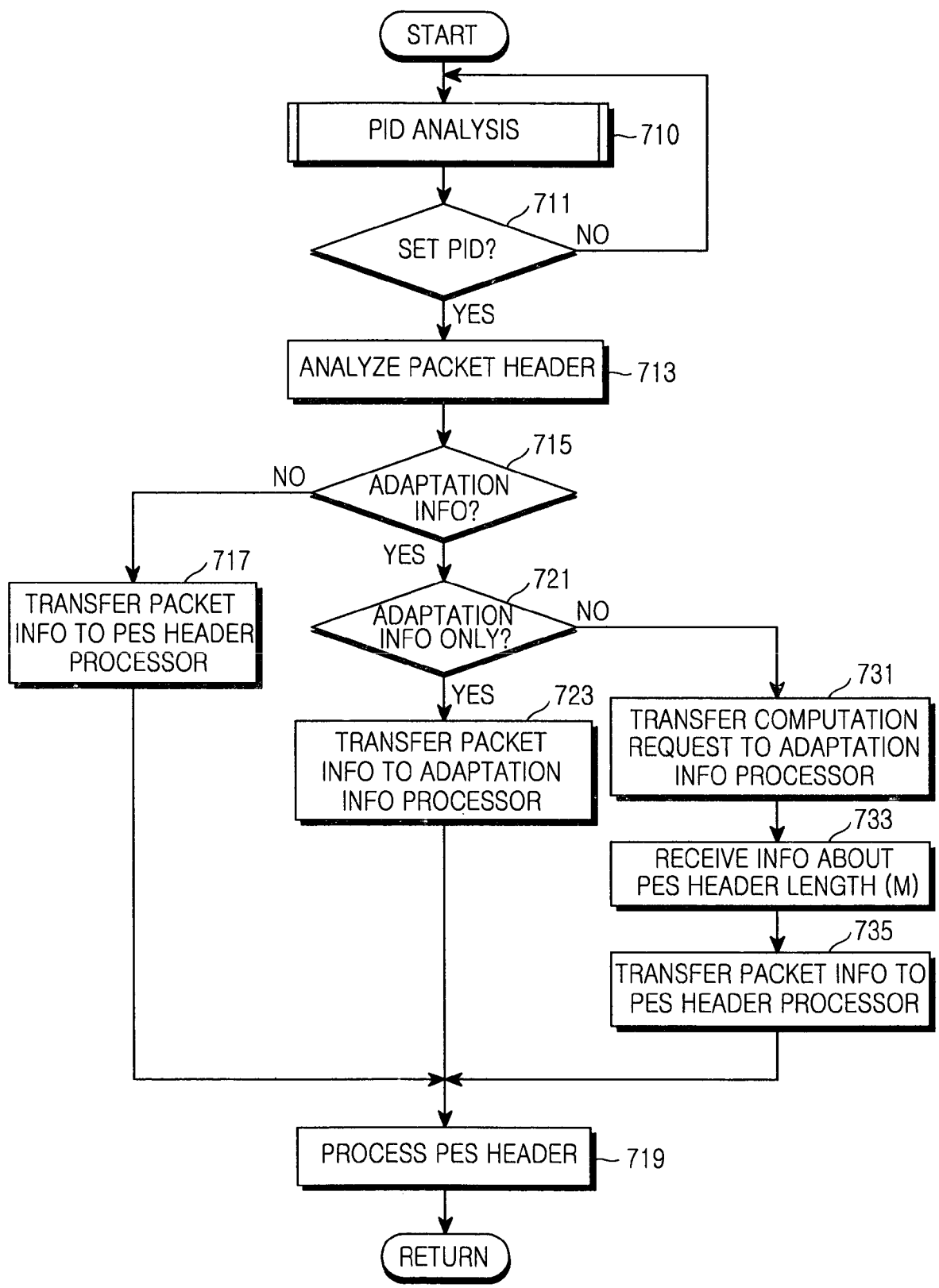

First, the operation of the packet header processor 515 will be described. FIGS. 14A and 14B are flowcharts illustrating a procedure for analyzing and processing a buffered packet header in the packet header processor 515. Here, FIG. 14A illustrates a procedure for transferring a process command from the adaptation information processor 517 to the PES header processor 519 when the adaptation information and the PES header are included in one packet. FIG. 14B illustrates a procedure for transferring a process command from the packet header processor 515 to the PES header processor 519.

Referring to FIG. 14A, the packet header is constructed by 4 bytes as illustrated in FIG. 8C, and is buffered in an area of $1^{st}$ to $4^{th}$ bytes of the buffer 513. The packet header includes a Product Identifier (PID). Here, the PID is used as information for identifying a Network Information Table (NIT), a Service Information Table (SIT), and audio or video information of a broadcasting channel in a subsequent packet. Here, the NIT is a frequency channel information table of a digital broadcasting station, and the SIT is a broadcasting channel table provided from a frequency channel. When the user selects an arbitrary digital broadcasting channel, the controller 300 receives the NIT and identifies the frequency channel used for the selected broadcasting channel. The controller 300 controls the RF tuner 310 to fix an RF channel at a frequency of the selected broadcasting channel. The digital broadcasting service provides a plurality of broadcasting channels through one frequency channel. Conventionally, 5 broadcasting stations use one frequency channel. Accordingly, information for identifying audio and video ESs of the plurality of broadcasting stations using one RF channel is included in the SIT. The controller 300 refers to the SIT and sets a PID for audio and video of a broadcasting channel desired by the user. The demultiplexer 410 retrieves a PID of received packets and demultiplexes input packets only when the retrieved PID is the set PID.

When the packet is buffered in the buffer 513, the packet header processor 515 analyzes a PID of a buffered packet header in step 701. When the analyzed PID is a PID for identifying the NIT, the packet header processor 515 detects the PID for identifying the NIT in step 703 and transfers packet data of the $5^{th}$ to $188^{th}$ bytes buffered in the buffer 513 to the controller 300 in step 705. After analyzing the NIT, the controller 300 controls the RF tuner 310 to fix it to a frequency channel of a broadcasting station selected by the user. Subsequently, when a PID for identifying the SIT is received, the packet header processor 515 detects the PID for identifying the SIT in step 707 and transfers packets buffered in the buffer 513 to the controller 300 in step 708. Subsequently, PIDs for identifying audio and video of the selected broadcasting station transferred from the controller 300 are received and set as target PIDs. Subsequently, the packet header processor 515 enables an operation for demultiplexing packets of the broadcasting station received after the set target PIDs are analyzed.

When the target PID is set, the packet header processor 515 determines if a PID of a packet header is the set PID. If a PID of the buffered packet is different from the set PID, the packet header processor 515 detects the different PID and disables a procedure for demultiplexing the input packet in step 711. However, if the PID included in the input packet header matches the set PID, the packet header processor 515 detects the matched PID and analyzes the packet header in step 713. The packet header as illustrated in FIG. 8C has PID information for identifying packet data and an adaptation field control parameter indicating if adaptation information is included. The packet header includes information associated with an error of the current packet, PES start, priority, scrambling mode, and count data based on the same PID. Moreover, the packet header includes the adaptation field control parameter for indicating the presence of the adaptation information to be processed in the adaptation information processor 517. The packet header processor 515 analyzes the adaptation field control parameter in the packet header, and determines if the operation of the adaptation information processor 517 is required. The packet header processor 515 analyzes the adaptation field control parameter in the packet header with a structure of FIG. 8C and Table 1 and determines if the adaptation information is included in the packet.

The adaptation information parameter is constructed by 2 bits, as illustrated in Table 1. If the parameter is "01", it means that the input packet is constructed by only a payload without adaptation information. If the parameter is "10", it means that the input packet is constructed by only the adaptation information. If the parameter is "11", it means that the input packet includes both the adaptation information and the payload. The packet header processor 515 analyzes the adaptation field control parameter, and detects the packet in which adaptation information is not included if the adaptation field control parameter is "01" in step 715. The packet header processor 515 commands the PES header processor 519 to process the remaining packet data (of 184 bytes) except the 4-byte packet header in step 717. Subsequently, the packet header processor 515 processes the packet header and transfers broadcasting-related information to the controller 300 in step 719. In this case, the adaptation information processor 517 does not operate.

If the adaptation field control parameter is "10", the packet header processor 515 detects that the input packet is constructed by only the adaptation information in step 721. The packet header processor 515 commands the adaptation information processor 517 to process the remaining packet data (of 184 bytes) except the 4-byte packet header in step 723. Subsequently, the packet header processor 515 processes the packet header and transfers broadcasting-related information to the controller 300 in step 719. In this case, the PES header processor 519 and the data processor 521 do not operate.

If the adaptation field control parameter is "11", the packet header processor 515 detects that the input packet includes both the adaptation information and the payload in step 721, and issues an operation command to the adaptation information processor 517 in step 725. The packet header processor 515 proceeds to step 719 to process the packet header and transfers a process result to the controller 300. At this time, the packet header processor 515 can also issue an operation command to the PES header processor 519. In this case, the packet header processor 515 transfers, to the adaptation information processor 517, position information for accessing data buffered in the buffer 513 along with the operation command, and transfers only the operation command to the PES header processor 519. Then, the PES header processor 519 prepares to process the PES header buffered in the buffer 513. After receiving start position information of the PES header from the adaptation information processor 517, the PES header processor 519 can start to process the PES header.

The packet header processor 515 analyzes a PID associated with a header of the received packet, and transfers NIT and SIT packets to the controller 300. The packet header processor 515 receives a PID for audio and video of a broadcasting station set by the controller 300 and sets a PID of a packet to be received. Subsequently, if a buffered packet has a target PID, the packet header processor 515 analyzes a packet header. If the buffered packet is an adaptation information packet, the packet header processor 515 commands the adaptation information processor 517 to operate. If the buffered packet is a PES header packet, the packet header processor 515 commands the PES header processor 519 to operate. At this time, the packet header processor 515 also transfers position information of the buffer for accessing and processing data to the processors 517 and 519. If the buffered packet includes both the adaptation information and the PES header, the packet header processor 515 commands the adaptation information processor 517 to operate, and transfers start position information of the adaptation information buffered in the buffer 513 to the adaptation information processor 517. The adaptation information processor 517 analyzes the adaptation information and notifies the PES header processor 519 of a position of the PES header buffered in the buffer 513.

If the packet includes both the adaptation information and the PES header, the packet header processor 515 can transfer information about a position in which the PES header is buffered to the PES header processor 519. FIG. 14B is a flowchart illustrating a method for transferring the position information of the PES header buffered in the buffer 513 from the packet header processor 515 to the PES header processor 519.

The operation of step 710 of FIG. 14B is the same as that of steps 701 to 709 of FIG. 14A. The operation of step 711 to 723 is also the same as the operation of FIG. 14A. At this time, if the buffered packet includes the adaptation information and the PES header as a result of analyzing the adaptation field control parameter, the packet header processor 515 detects it in step 721 and commands the adaptation information processor 517 to operate in step 731. Where step 721 detects other than adaptation information, the packet header processor 515 requests the computation of an adaptation information length (of N bytes where N can be identified by the adaptation field length of the adaptation information header). In step 733, information about the adaptation information length is transferred from the adaptation information processor 517. After a position of the PES header buffered in the buffer 513 is determined, the packet header processor 515 commands the adaptation information processor 517 to process data of the N bytes and commands the PES header processor 519 to process data of (184−N) bytes in step 735.

When the packet data is buffered, the packet header processor 515 analyzes a packet header. If the packet has a set PID, the packet header processor 515 analyzes an adaptation information control parameter included in the packet header and commands the processors to operate. When the packet is constructed by only a payload, the packet header processor 515 operates the PES header processor 519 and commands the PES header processor 519 to process a packet buffered in the buffer 513. At this time, the adaptation information processor 517 does not operate. For this reason, the demultiplexer 410 with a serial structure can reduce a time for buffering a packet in the adaptation information processor 517 and a process time in the adaptation information processor 517.

When the input packet is constructed by only the adaptation information, the packet header processor 515 operates the adaptation information processor 517 and commands the adaptation information processor 517 to process a packet buffered in the buffer 513. At this time, the PES header processor 519 and the data processor 521 do not operate. For this reason, the demultiplexer 410 with the serial structure can reduce a time for buffering a packet in the PES header processor and the data processor 521 and a process time in the processors.

When the input packet includes both the adaptation information and the payload, the packet header processor 515 identifies a length of the adaptation information included in the packet from the adaptation information processor 517, sets a size of the payload and the adaptation information, and commands the adaptation information processor 517 and the PES header processor 519 to process the adaptation information and the payload in the packets buffered in the buffer 513. When both the adaptation information and the payload are included in one packet, it has been described that the packet header processor 515 identifies the length of the adaptation information included in the packet from the adaptation information processor 517, and sets a size of packet data to be processed in the adaptation information processor 517 and the PES header processor 519. However, if both the adaptation information and the payload are included, the adaptation information processor 517 can implement a method for identifying the adaptation information length from the adaptation information header and commanding the PES header processor 519 to process the remaining packet data except the adaptation information.

When the input packet includes the adaptation information and the payload, the adaptation information processor 517 and the PES header processor 519 can simultaneously process packet data of a set size. For this reason, the demultiplexer 410 with the serial structure can reduce a packet buffering time and a time for serially processing a packet in the processors.

Figure 15:
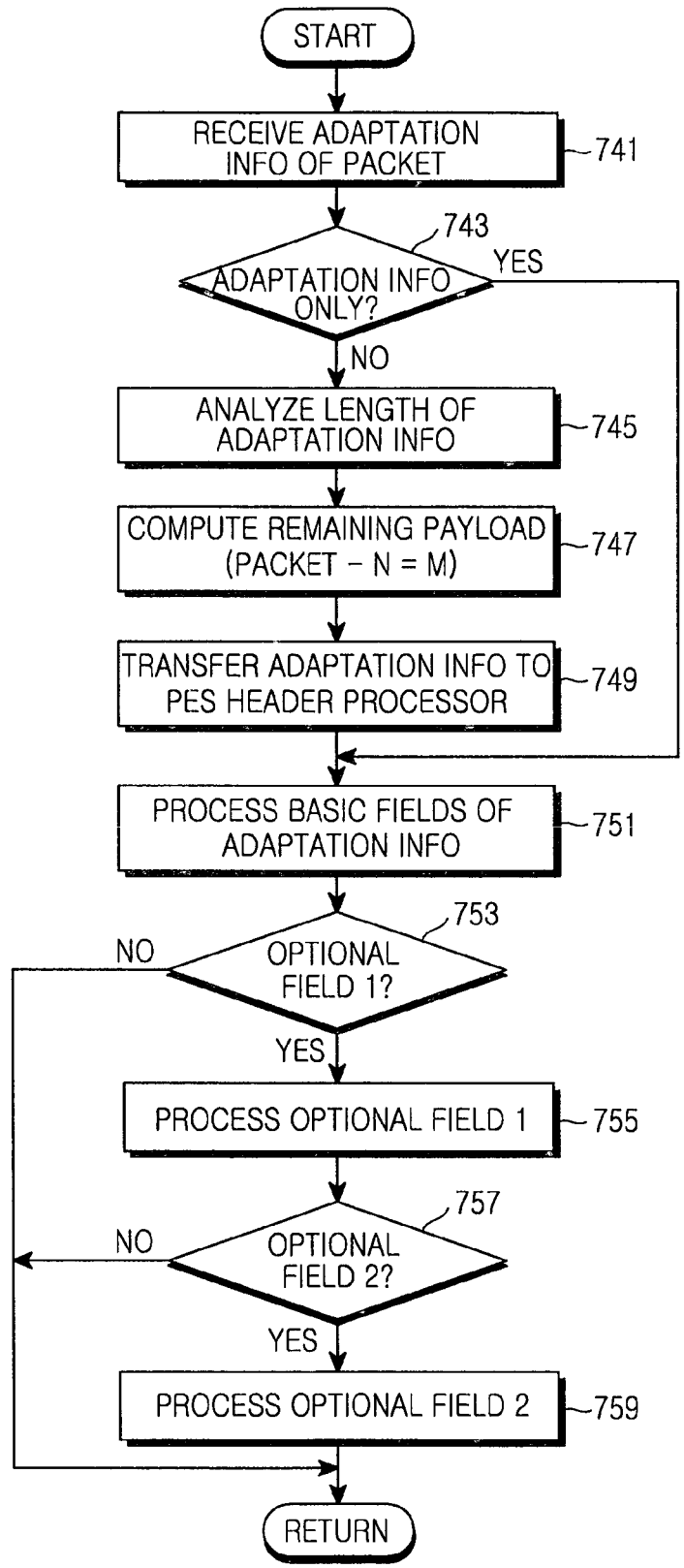
FIG. 15 is a flowchart illustrating a procedure for processing adaptation information in an adaptation information processor in accordance with the present invention.

The adaptation information processor 517 processes adaptation information of the packet, operates in response to the command of the packet header processor 515, and receives data of the area of the $5^{th}$ to $188^{th}$ bytes except the packet header area of the buffer 513 or some data thereof. The adaptation information processor 517 identifies a flag for determining the presence of detailed information of the adaptation information header as illustrated in FIGS. 9A to 9C, and analyzes and stores the adaptation information according to an identification result. Here, the stored information may be a Program Clock Reference (PCR) corresponding to a reference value of program time information, and so on. The adaptation information is coupled to the controller 300 and/or the decoders 430 and 450 such that it can be transferred. FIG. 15 is a flowchart illustrating a procedure for operating the adaptation information processor 517 in accordance with an embodiment of the present invention.

Referring to FIG. 15, the adaptation information processor 517 receives an operation command and buffering position information of the adaptation information from the packet header processor 515 in step 741. At this time, a method for transferring an adaptation information process command from the packet header processor 515 is set by an adaptation field control parameter of the packet header as described above. If a total of the buffered packet is the adaptation information, the packet header processor 515 issues a command for processing a total area of the buffer 513. Then, the adaptation information processor 517 determines that the total of the packet buffered in the buffer 513 is the adaptation information, and performs a process while performing a procedure as illustrated in FIG. 15.

When both the adaptation information and PES header data are included in the buffered packet, the packet header processor 515 transfers, to the adaptation information processor 517, a command for processing the adaptation information and the first position information of the buffer 513 in which the adaptation information is buffered. The adaptation information processor 517 accesses the buffered adaptation information, identifies the adaptation field length, identifies a position in which the PES header information is stored in the buffer 513, and simultaneously transfers information about the position in which the PES header data is buffered and the operation command to the PES header processor 519. The adaptation information processor 517 receives a request for identifying the adaptation field length from the packet header processor 515 transfers a parameter value of the adaptation field length of the adaptation information header as illustrated in FIG. 9B to the packet header processor 515. The packet header processor 515 transfers buffering position information of the adaptation information and the payload and the operation command to the adaptation information processor 517 and the PES header processor 519. Next, there will be described the case where the adaptation information processor 517 transfers buffering position information of the PES header data and the operation command to the PES header processor 519 when the packet includes both the adaptation information and the PES header data.

When receiving the command for processing the adaptation information from the packet header processor 515, the adaptation information processor 517 can determine if the buffered packet is constructed by only the adaptation information or includes the PES header data according to the position information of the transferred adaptation information. If the packet is constructed by only the adaptation information, the adaptation information processor 517 detects it in step 743 and proceeds to step 751. However, if the packet includes the adaptation information and the PES header, the adaptation information processor 517 analyzes a length of the adaptation field buffered in the $5^{th}$ byte area of the buffer 513 in the adaptation information structure of FIG. 9A and identifies the length of the adaptation field included in the packet in step 745. (Here, it is assumed that the adaptation field length is N.) The adaptation information processor 517 computes the length and position information of the PES header buffered in the buffer 513 in step 747. At this time, the packet data is 184 bytes because the packet header is excluded from 188 bytes. Accordingly, the adaptation information stored in the buffer 513 is present in a position of the $5^{th}$ to $N^{th}$ bytes. The PES header data buffered in the buffer 513 is in a position of the $(188-N)^{th}$ $(=M^{th})$, where M is the PES header length, to $188^{th}$ bytes. Subsequently, the adaptation information processor 517 transfers the operation command and the position data for buffering the computed PES header data to the PES header processor 519.

Subsequently, the adaptation information processor 517 processes basic field data of the adaptation field as illustrated in FIG. 9A in step 751. Then, the adaptation information processor 517 checks 5 flags of adaptation header data as illustrated in FIG. 9A, and determines if adaptation information added to Optional Field 1 is present in step 753. That is, the adaptation information processor 517 checks the 5 flags of an adaptation information header as illustrated in FIG. 9A, and determines if Optional Field 1 of the adaptation field is included. The 5 flags have the structure as illustrated in Table 2. When the 5 flags are set, data of Optional Field 1 as illustrated in FIG. 9B is present in Optional Field 1 as illustrated in FIG. 9A. Then, the adaptation information processor 517 processes data of Optional Field 1 of the adaptation field as illustrated in FIG. 9B in step 755 and determines if Optional Field 2 of the adaptation field is included by checking the 3-flag field as illustrated in FIG. 9B in step 757. When a flag value is present in the 3 flags as shown in Table 3, data of Optional Field 2 of the adaptation field as illustrated in FIG. 9C is present in Optional Field 2 of the adaptation field as illustrated in FIG. 9B. Then, the adaptation information processor 517 processes the data of Optional Field 2 of the adaptation field as illustrated in FIG. 9C in step 759. However, if a flag value is not present in the 5 or 3 flags in step 753 or 757, the adaptation information processor 517 determines that an optional field of the adaptation field is absent and returns.

As described above, the adaptation information processor 517 processes basic field data of the adaptation field as illustrated in FIG. 9A, determines if adaptation information added to Optional Field 1 is present, and reads and identifies a 5-flag value of FIG. 9A. If the flag value is present in the 5-flag field, the adaptation information processor 517 processes Optional Field 1 of the adaptation field of FIG. 9A. Subsequently, the adaptation information processor 517 determines if Optional Field 2 is present in the adaptation information as illustrated in FIG. 9B, and reads and identifies a 3-flag value of FIG. 9B. When flag value is present in the 3-flag field, the flag value is present in Optional Field 2 of the adaptation field of FIG. 9B as illustrated in FIG. 9C. The adaptation information processor 517 processes Optional Field 2 of the adaptation field as illustrated in FIG. 9C.

When the packet includes the PES header data or includes the adaptation information and the PES header data, the PES header processor 519 operates. At this time, the operation is performed under the control of the packet header processor 515 or the adaptation information processor 517. The packet header processor 515 or the adaptation information processor 517 transfers information about a position in which the PES header data is buffered in the buffer 513. When both the adaptation information and the payload data are present in the packet, the PES header processor 519 accesses the PES header data after the adaptation information processor 517 accesses all the adaptation information. At this time, the packet header processor 515 and the adaptation information processor 519 cannot determine if the packet is constructed by a PES header or by the PES header and an actual data ES. Accordingly, the packet header processor 515 and the adaptation information processor 517 may regard the buffered packet data as the PES header. The PES header processor 519 analyzes the buffered PES header data to identify a length of the PES header, determines a length and position of the actual data except the PES header, and transfers buffering position data of the actual data ES to the data processor 521. Optional field data of the PES header is transferred one time per frame in the case of video data, and is transferred one time per set of frames in the case of audio data. Packets may mostly include only basic field data of the PES header.

Figure 16:
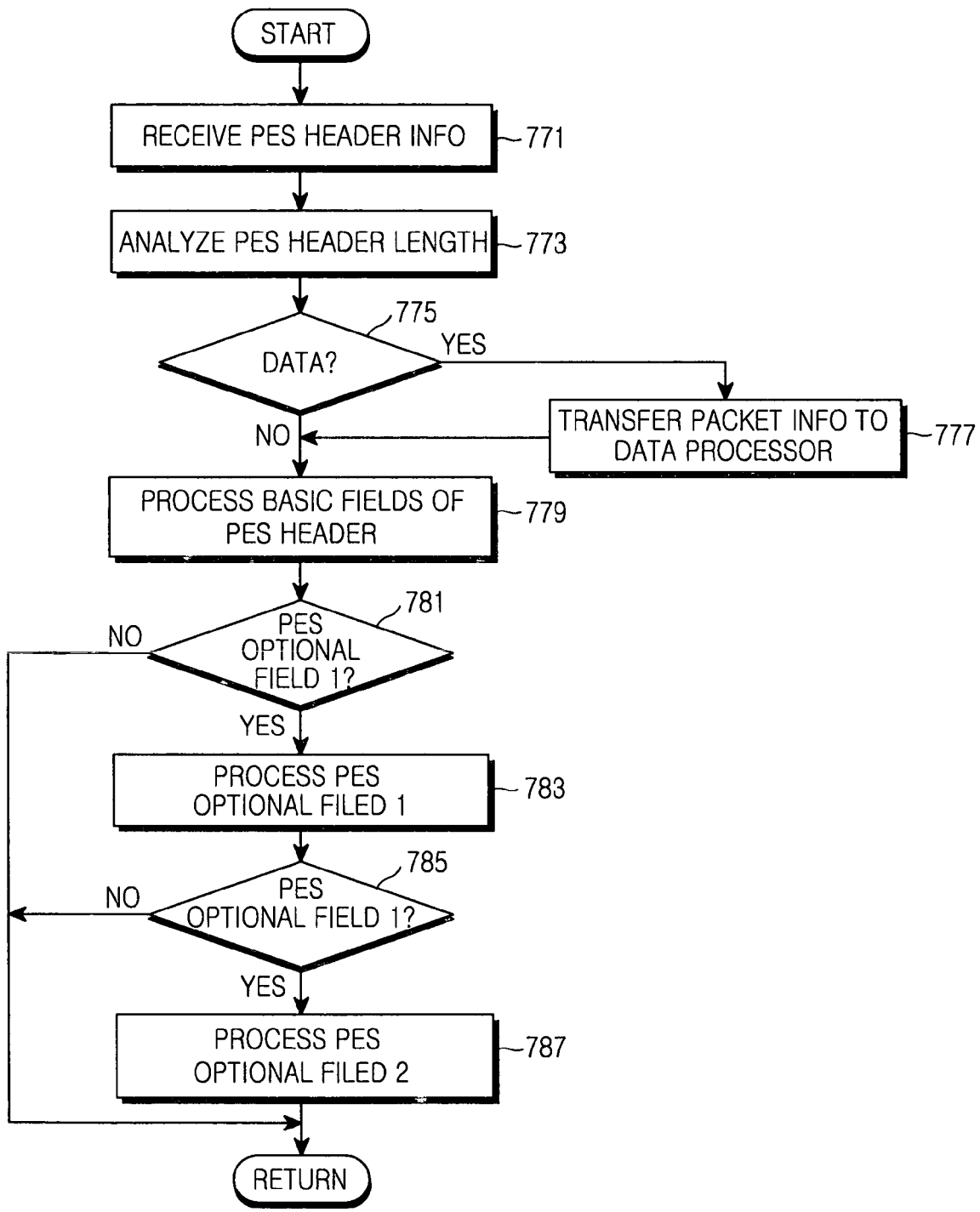
FIG. 16 is a flowchart illustrating a procedure for processing PES header information in a PES header processor of FIG. 7 in accordance with the present invention.

FIG. 16 is a flowchart illustrating a procedure for processing PES header data in the PES header processor 519.

Referring to FIG. 16, the PES header processor 519 receives an operation command and information about a position in which the PES header data is buffered from the packet header processor 515 or the adaptation information processor 517 in step 771. The PES header processor 519 analyzes data of a buffer area of the $5^{th}$ to $188^{th}$ bytes except the packet header area in the packet buffered in the buffer 513 or data of an area of the $(188-N)^{th}$ to $188^{th}$ bytes set in the packet header processor 515. At this time, the PES header processor 519 identifies "10" indicating the start of the PES header with the structure of FIG. 10A, and analyzes a length of PES header data. The length of PES header data can be identified in a position of the $3^{rd}$ byte from a buffering start position of the PES header data. Subsequently, when a position value of the transferred PES header is more than a length value of the identified PES header data, the PES header processor 519 detects the presence of an actual data ES in step 775. The PES header processor 519 determines the remaining buffering data except the length of the PES header data as the actual data ES, and transfers an operation command and buffering position information of the actual data ES to the data processor 521 in step 777. That is, the PES header data can be constructed by only header data and can include an actual data ES. The packets mostly include the actual data ES. Accordingly, the PES header processor 519 transfers, to the data processor 521, buffering position information of the remaining ES data except the PES header data in a packet buffered in the buffer 513. The data processor 521 can process the transferred buffering position information.

When an actual data ES is not present in the buffered packet in step 775 or after step 777 is performed, the PES header processor 519 analyzes and processes PES information through basic field flags of the PES header as illustrated in FIG. 10A. A basic field of the PES header includes broadcasting information. The processed broadcasting information is transferred to the controller 300. After basic field data of the PES header is processed, the PES header processor 519 checks 7 flags of the basic field as illustrated in FIG. 10A, and determines if Optional Field 1 of the PES header is present in step 781. The 7 flags have a function as shown in Table 4. When arbitrary flags of the 7 flags are set, the PES header processor 519 detects the presence of PES Optional Field 1 of the PES header in step 781, and processes PES Optional Field 1 as illustrated in FIG. 10B to transfer a process result to the controller 300 in step 783. Subsequently, the PES header processor 519 checks 5 flags of a PES extension field as illustrated in FIG. 10C and determines if PES Optional Field 2 of the PES header is present as illustrated in FIG. 10C in step 785. When arbitrary flags of the 5 flags are set as shown in Table 5, the PES header processor 519 detects the presence of PES Optional Field 2 in step 785 and processes data of Optional Field 2 of the PES header as illustrated in FIG. 10D to transfer a process result to the controller 300 in step 787. However, when it is determined that an optional field of the PES header is not present in step 781 or 785, the PES header processor 519 ends the PES header process and returns.

As illustrated in FIG. 16, the PES header processor 519 checks the PES header length of FIG. 10A, identifies a length M of the PES header included in the packet, and sets, to the PES header, data of the length M from (184−N) bytes of the buffer 513 transferred from the packet header processor 515. A command for processing data of the length (corresponding to (184−N-M) bytes) of the buffer 513 is transferred to the data processor 521. At this time, N is the length of adaptation information. When the packet is constructed by only a PES header and an actual data ES, the adaptation information length is 0. According to the same method as that for processing the adaptation information in the adaptation information processor 517, the PES header processor 519 processes basic fields of the PES header as illustrated in FIG. 10A, checks the 7-flag field of the basic fields, and processes PES Optional Field 1 as illustrated in FIG. 10B if a set flag is present. PES Optional Field 1 is provided with a PES header extension field. The PES header extension field has the structure as illustrated in FIG. 10C. The PES header processor 519 checks the 5-flag field of FIG. 10C and processes PES Optional Field 1 if a set flag is present.

The PES header processor 519 processes the PES header as illustrated in FIGS. 10A to 10D. The PES header processor 519 controls the operation of data processor 521. After determining if a packet currently input from the controller 300 is video or audio data, the data processor 521 generates a video or audio ES from data buffered in the buffer 513. The data processor 521 transfers the video or audio ES to the video decoder 430 or the audio decoder 450. That is, when the packet is buffered in the buffer 513, the packet header processor 515 analyzes a PID of a buffered packet header, determines if a packet to be input to the controller 300 is video or audio, and transfers a determination result to the controller 300. Then, the controller 300 notifies the data processor 521 of a video or audio packet such that the input packet can be identified. Here, there has been described that the controller 300 transfers packet identification information to the data processor 521. Alternatively, the packet header processor 515 may transfer the packet identification information to the data processor 521 after analyzing the packet header. At this time, the packet header processor 515 knows a PID for video and audio of a channel set as described above. Accordingly, a PID included in the packet header is analyzed. When the packet header includes the set video or audio PID, the packet header processor 515 can notify the data processor 521 that the set video or audio PID is included.

The basic fields of the PES header as illustrated in FIG. 10A are included in every packet. When an optional field is not included, the basic fields of the PES header are constructed by 3 bytes. Accordingly, an actual data ES included in the packet may be a maximum of 181 bytes (corresponding to the remaining byte data except 4 bytes of the packet header and 3 bytes of the PES header). The data processor 521 can receive data of an area of $8^{th}$ to $188^{th}$ bytes of the buffer 513, identify the remaining actual ES from the PES header processor 519, and output a video or audio ES. That is, the data processor 521 processes the remaining packet data (one-packet data (188 bytes)—packet header (4 bytes)—adaptation information (N bytes)—PES header (M bytes)) after a data process in the processors 515 and 517. The data processor 521 separates and parses the video or audio ES according to a value of a PID included in the packet header. At this time, N and M are determined by the adaptation field length of FIG. 9A and the PES header data length of FIG. 10A. At this time, the adaptation field length and/or the PES header data length may be 0 (i.e., N=M=0, N=0, or M=0). When the adaptation field length and/or the PES header data length may not 0 (i.e., N≠M≠0, N≠0, or M≠0), the data processor 521 simultaneously process actual data along with the adaptation information processor 517 and/or the PES header processor 519, such that packet data can be quickly demultiplexed.

Conventionally, packets of the input TS signal do not include an optional filed of the adaptation field and the PES header. That is, the packet data includes the adaptation field and/or the PES header, if needed. Accordingly, the received packet is mainly constructed by actual data (ES). In this case, the packet header processor 515, the PES header processor 517, and the data processor 521 only operate, but the adaptation information processor 517 does not operate. The PES header processor 517 only processes basic field data of the PES header. When a packet received in the demultiplexer 410 is demultiplexed into the decoders 430 and 450, actual data (ES) can be quickly demultiplexed.

Table 6 provides an example of a configuration ratio between PES header and data packets included in the packet data. As shown in Table 6, the number of PES header packets or the number of adaptation information packets is much smaller than the number of data packets.

TABLE 6

| | Total number of packets | 55,476 packets |
|---|---|---|
| PID | Audio PID | 0X0259 |
| | Video PID | 0X0258 |
| PES packets | Total PES packets | 104 packets |
| | Audio PES | 18 packets |
| | Video PES | 86 packets |

When the packet is input, the buffer 513 sequentially buffers the input packet in a byte size. Previously buffered packets are sequentially output to the processors 515 to 521. At this time, the packet header processor 515 analyzes packet headers output from the packet header area and analyzes PIDs. The packet header processor 515 analyzes adaptation field control parameters and determines if the operation of the adaptation information processor 517 is required. When the packet includes the adaptation information, the packet header processor 515 commands the adaptation information processor 517 to operate, and transfers buffering position data of the adaptation information stored in the buffer 515.

When the adaptation information is output, the adaptation information processor 517 receives an output of the buffer 513 and identifies a length of the adaptation information. When the packet is constructed by only the adaptation information, the adaptation information processor 517 processes an adaptation information packet output from the buffer 513. When the packet includes PES header information, an operation command and position information of PES header data stored in the buffer 513 are transferred to the PES header processor 519. The adaptation information processor 517 processes the adaptation information sequentially output from the buffer 513.

When an operation command and position data of the buffer 513 in which the PES header data is buffered are received from the packet header processor 515 or the adaptation information processor 517, the PES header processor 519 receives the PES header output from the buffer 513 and checks a length of the PES header when the PES header data is output from the buffer 513. When the packet is constructed by only the PES header, the PES header processor 519 processes PES header data sequentially output from the buffer 513. The PES header data may be PES header data for audio or video as described with reference to Table 6. However, when the packet includes the PES header data and an actual data ES, the PES header processor 519 receives an output of the buffer 513 and analyzes a length of the PES header when the PES header data is output from the buffer 513. After the length of the actual data ES is analyzed, an operation command and position data of the actual data ES stored in the buffer 513 are transferred to the data processor 521. Basic field data of the PES header output from the buffer 513 is processed.

When the data processor 521 receives, from the PES header processor 521, the operation command and the position data of the actual data ES stored in the buffer 513, it refers to packet identification information (or an audio or video PID) received from the packet header processor 515 or the controller 300, generates an audio or video ES from output data when the actual data is output from the buffer 513, demultiplexes the audio or video ES, and outputs the demultiplexed audio or video ES to the decoder 450 or 430. At this time, the audio or video ES output from the data processor 521 is actual data obtained by de-packetizing the packet data.

In the demultiplexing apparatus in accordance with the embodiment of the present invention as described above, the associated processors operate according to the packet header information when packets of the input TS signal include the adaptation information and/or PES header. For example, when the input packet is constructed by only the adaptation information, the adaptation information processor 517 operates and processes the input packet and the PES header processor 519 and the data processor 521 do not operate. When the input packet is constructed by the PES header and the actual data, the PES header processor 519 determines if the PES header is included. When the packet is constructed by only the PES header, only the PES header processor 519 operates. When the packet includes the actual data, the PES header processor 519 and the data processor 521 operate together to process the PES header and the actual data (ES). When the input packet is constructed by the adaptation information, and/or the PES header and the actual data, the adaptation information processor 517 and/or the PES header processor 519 and the data processor 521 operate together to process the adaptation information and/or the PES header and the actual data. When the packet includes the adaptation information and/or the PES header as well as the actual data (or ES), the processors for processing associated data operate in parallel and simultaneously process the data, such that demultiplexing can be quickly performed.

In the demultiplexer with the serial structure, the packet header processor 515, the adaptation information processor 517, the packet header processor 519, and the data processor 521 sequentially process data. When information (of the adaptation field, the PES header, or the data) to be processed is not present, sequential operation of all the processors may unnecessarily consume processor time. However, an embodiment of the present invention can reduce a data process time and can implement a high demultiplexing rate by operating the associated processor to process data only when information to be processed is present after a received packet is analyzed.

The demultiplexer with the serial structure has an input buffer in a front end of the processors (or an output buffer in a rear end of the processors). Because data output from the processor is transmitted in a byte unit, a very fast clock must be used to transfer a packet. Because multi-step buffers are used, the structure may require a relatively long time to transfer the data. However, the present invention can significantly reduce a time for transferring data and can significantly improve a demultiplexing rate, because data of a packet size is buffered in the buffer in parallel and the processors simultaneously access the buffer in parallel.

Further, all input packet bytes are not retrieved when synchronization is detected. After stored bytes are analyzed while the input packet is stored in the buffer, a difference value is computed when a detected sync byte is out of a set sync byte position of the buffer. The input byte data is delayed by the computed difference value, such that synchronization is implemented. Therefore, the sync detection method can be simplified.

A structure for processing IP-based broadcasting data as in the digital broadcasting receiver of the DVB-H scheme will now be described. The digital broadcasting receiver of the DVB-H scheme has the same structure as that of FIG. 5. Because a broadcasting signal based on the DVB-H IP must be processed in the digital broadcasting receiver of the DVB-H scheme, the broadcasting receiver (of the RF tuner 310 and the demodulator 320) and the multimedia processor 330 have a structure different from those of the digital broadcasting receiver of the DVB-T scheme.

Figure 17:
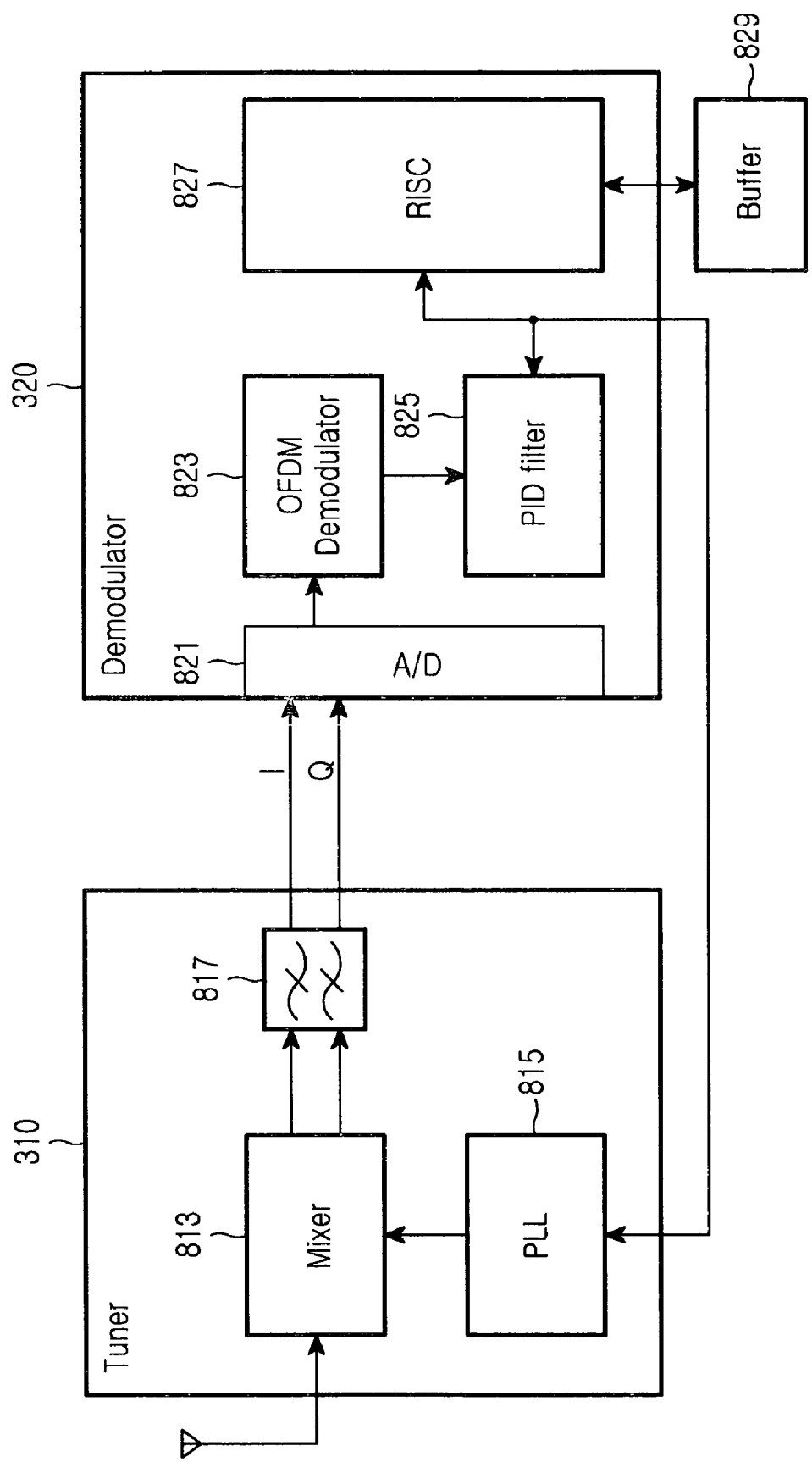
FIG. 17 illustrates a structure of a broadcasting receiver for receiving broadcasting data based on an Internet Protocol (IP) in accordance with the present invention.

FIG. 17 illustrates a structure of the DVB-H broadcasting receiver (of the RF tuner 310 and the demodulator 320).

Referring to FIG. 17, a Phase-Locked Loop (PLL) 815 of the tuner 310 generates a frequency for setting a physical frequency of a broadcasting channel under control of a Reduced Instruction Set Computer (RISC) 827. A mixer 813 mixes a received broadcasting signal and an output frequency of the PLL 815, thereby outputting a broadcasting signal of the set physical channel frequency. A filter 817 filters and outputs a signal of the set physical channel frequency band. An Analog-to-Digital (A/D) converter 821 of the demodulator 320 converts the output signal of the tuner 310 to digital data. An Orthogonal Frequency Division Multiplexing (OFDM) demodulator 823 demodulates a modulated broadcasting signal. A PID filter 825 filters a signal with a PID of a set broadcasting channel from the demodulated signal. A signal output from the PID filter 825 is buffered in a buffer 829 through the RISC 827. The RISC 827 controls a time slicing operation to reduce power consumption of the digital broadcasting receiver and performs a Multi-Protocol Encapsulation-Forward Error Correction (MPE-FEC) function for improving a reception rate by correcting an error occurring in a reception time. The data buffered in the buffer 829 is an IP datagram.

The tuner 310 uses a direct conversion scheme. The tuner 310 selects a broadcasting signal with a frequency of the set broadcasting channel, and converts the selected broadcasting signal to an In-phase/Quadrature (I/Q) signal. The demodulator 320 converts an output of the tuner 310 to digital data and performs OFDM demodulation. In this case, demodulated data has an MEPG2 TS structure. Here, data with the PID of the set broadcasting channel is filtered. At this time, filtered data based on the PID has time information for time slicing and a parity byte table for the MPE-FEC function. The time slicing is a technique, adopted to reduce power consumption of hardware in the digital broadcasting receiver, that operates the hardware only when desired broadcasting data is received and turns off the hardware when undesired data is received. When the time slicing technique is used, only PID data of desired broadcasting is output. Accordingly, only data mapped to a desired PID is received through the PID filter and the RISC 827 performs an MPEG2 TS demultiplexing process. At this time, the MPEG2 TS demultiplexing process performed in the PID filtering process demultiplexes a signal of a broadcasting channel set by the user among many broadcasting channels using the same physical channel frequency, and is different from the MPEG2 TS demultiplexing process performed in the multimedia processor 330. When the MPEG2 TS demultiplexing process is performed, a FEC table constructed by only the parity information and an MPE table and can be obtained. The MPE-FEC function is performed using the MPE table and the FEC table.

The broadcasting receiver sets a physical channel frequency of the tuner 310 in step 341. When receiving control data for setting a broadcasting channel frequency from the controller 300, the RISC 827 detects the received control data and sets the physical channel frequency in the PLL 815 of the tuner 310. Subsequently, the RISC 827 sets a coding scheme, a coding rate, a guard interval, and so on in the OFDM demodulator 823. When the physical frequency is set, the tuner 310 of the broadcasting receiver outputs a broadcasting signal of a set physical channel frequency.

Then, the broadcasting receiver converts an output of the tuner 310 to digital data, performs an OFDM (or Coded Orthogonal Frequency Division Multiplexing (COFDM)) demodulation process for the digital data, and filters data with the set PID among the demodulated data. A PID filtering operation will be described. It is determined if a PID of a TS stream output from the demodulator 320 matches the set PID (or the PID of the broadcasting channel selected by the user). If the two PIDs are equal to each other, the broadcasting receiver controls the operation of the tuner 310 and the demodulator 320 according to time slicing information after analyzing a PID of the input TS stream. However, if the two PIDs are different from each other, the broadcasting receiver stops the PID filtering process and waits for the matched PID to be input.

Subsequently, the broadcasting receiver demultiplexes the filtered data based on the PID, and transfers the time slicing information to the PID filter 825 after extracting the time slicing information. After storing an MPE section/FEC section of received data in the buffer, the broadcasting receiver determines if all burst data have been received. When the burst data has not been received, the broadcasting receiver repeatedly performs the above-described operation. When all the burst data have been received, a Reed-Solomon decoding operation is performed on the buffered data and an interrupt signal is issued to a multi-date processor 330. Then, the broadcasting receiver waits for the next burst data of the set PID to be received.

An IP datagram serving as final data obtained by performing the MPEG2 TS demultiplexing and MPE-FEC processes in the RISC 827 is transferred, such that the broadcast is reproduced.

Figure 18:
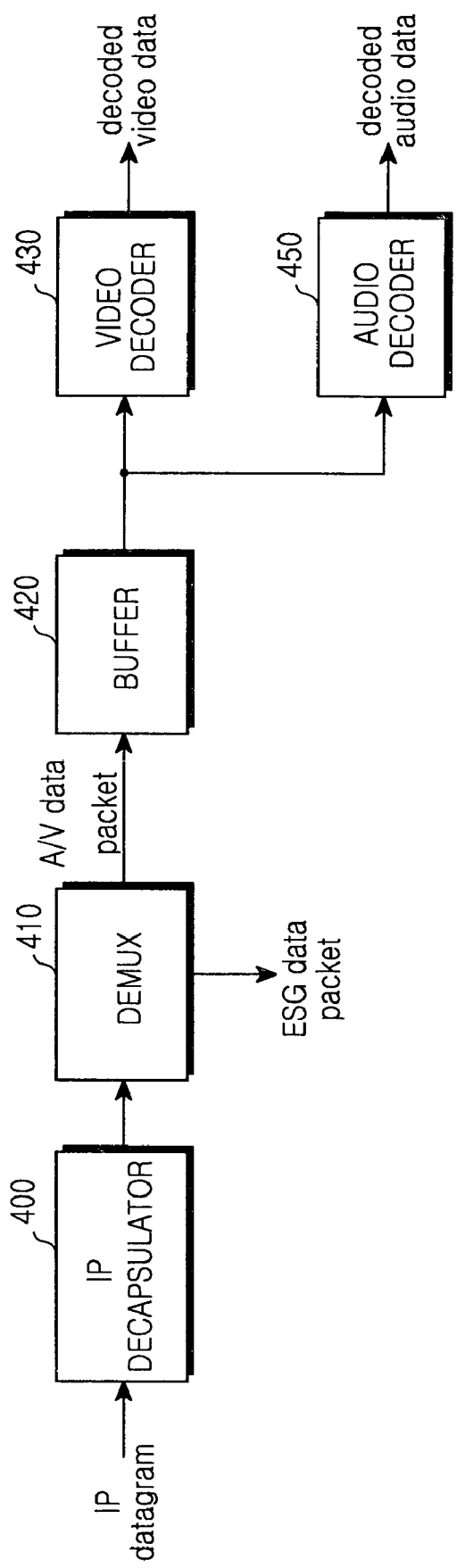
FIG. 18 illustrates a structure of a multimedia processor for processing a broadcasting packet data stream based on the IP in accordance with the present invention.

Then, the multimedia processor 330 receives the IP datagram output from the demodulator 320 and decapsulates and demultiplexes IP information, thereby processing audio and video data. FIG. 18 illustrates a structure of the multimedia processor 330.

Referring to FIG. 18, an IP decapsulator 400 processes the IP information from the IP datagram output from the demodulator 320, and generates a service data packet stream and an ESG data packet stream. A payload of the service data packet stream is transferred to the demultiplexer 410, and the ESG data packet stream is applied to the controller 300. The payload of the service data packet stream applied to the demultiplexer 410 is demultiplexed into an A/V packet data stream. A process after the demultiplexer 410 is the same as that of the DVB-T procedure. After the IP information is decapsulated in the case of the service data packet stream, audio and video packets are processed as in the structure and method based on DVB-T.

A procedure for operating the digital broadcasting receiver will be described.

First, a procedure for receiving and processing digital broadcasting will be described. The controller 300 outputs channel data for receiving a broadcasting channel signal set by the user to the broadcasting receiver. At this time, the channel data may be physical channel frequency information of desired broadcasting and a Program Identification (PID) of a broadcasting channel. The broadcasting receiver is configured by the tuner 310 and the demodulator 320. The tuner 310 sets a physical channel according to channel data set by the controller 300 and receives a broadcasting signal transmitted to an associated frequency channel. The demodulator 320 of the broadcasting receiver demodulates a broadcasting signal output from the tuner 310, filters a PID of the demodulated signal, and applies a desired broadcasting channel signal to the multimedia processor 330. At this time, the IP datagram transferred to the multimedia processor 330 is a broadcasting signal including the IP information. At this time, the IP datagram has a structure as shown in Table 7. Here, the service (A/V) data packet stream has a structure as shown in Table 8, and the ESG data packet stream has a structure as shown in Table 9.

TABLE 7

| Service 1 | Service 2 | Service 3 | Data 1 | Data 2 | — |

TABLE 8

| IP header | RTP header | Payload | IP header | RTP header | Payload | — |

TABLE 9

| IP header | FLUTE header | Payload | IP header | FLUTE header | Payload | — |

The IP datagram transferred from the broadcasting receiver can have a structure as shown in Table 8 and Table 9. The IP header can have a structure as shown in Table 10.

TABLE 10

| Version | IHL | Type Of Service | | Total Length |
|---------|-----|-----------------|-------|----------------|
| | Identification | | Flags | Fragment Offset |
| Time To Live | | Protocol | | Header Checksum |
| | | Source address | | |
| | | Destination address | | |
| | | Options | | Padding |

Table 10, the Version field (of 4 bits) is a version of an IP format. Currently, Internet Protocol version 4 (IPv4) is used. IPv6 has been proposed as the next-generation format, and its use is being extended. The Internet Header Length (IHL) field (of 4 bits) indicates the length of the IP header. The IP header length is configured by a size of 20 bytes (i.e., 32 bits*5 rows=160 bits). Four bytes of the last row is an option. The Type Of Service field (of 8 bits) is an item for controlling a priority of an IP datagram to be transmitted and performs a Quality of Service (QoS) function. The Total Length field (of 16 bits) is an item for indicating a size of an IP datagram to be transmitted. The Total Length field indicates a size of a sum of actual data (or datagram) subsequent to the IP header. The Identification field (of 16 bits) is a serial number for identifying each datagram fragment when a datagram to be transmitted is fragmented. The Flags field (of 3 bits) is used to report information about datagram fragmentation. The Fragment Offset field (of 13 bits) indicates a position of the current datagram fragment in an original datagram when the datagram is fragmented. The Time To Live field (of 8 bits) is referred to the TTL, and designates a datagram lifetime. The Header Checksum field (of 16 bits) is information for checking a header error. The Source Address field (of 32 bits) is an IP address of a (sending) side for sending the datagram, and the Destination Address field (of 32 bits) is an IP address of a (receiving) side for receiving the datagram. The Options field (of a variable size) is used to add a specific function according to program characteristics. This field is not essential and can be used to add a security function, a QoS function, or additional functions associated with routing to the datagram. The Padding field (of a variable size) is used to set the 32-bit size and is set to 0.

When the digital broadcasting signal is a DVB-H signal, a received broadcasting signal is data with an MPEG2 TS structure based on the IP. Accordingly, when the DVB-H broadcasting signal is received, the multimedia processor 330 removes IP information through the IP decapsulator 400, analyzes header information in the received MPEG2 TS structure, and demultiplexes and outputs video and audio data through the demultiplexer 410.

An IP datagram output from the broadcasting receiver is input in the form of Table 7. The IP datagram can have a structure as shown in Table 8 or 9. Accordingly, when the IP datagram with the structure as shown in Table 7 is input, the IP decapsulator 400 analyzes an IP header as shown in Table 10 and identifies the IP version and the used protocol. Here, the IP version may be IP Version 6 or IP Version 4. Subsequently, the IP decapsulator 210 parses a header of an IP Version 6 and retrieves the protocol when the IP version is IP Version 6. The IP decapsulator 400 parses a header of the IP Version 4 and retrieves the protocol when the IP version is IP Version 4. Here, the protocol can use User Datagram Protocol (UDP) and Transmission Control Protocol (TCP)/IP. Accordingly, the IP decapsulator 400 identifies the protocol and a field of the IP header, and computes a payload length. Subsequently, the IP decapsulator 400 extracts a payload datagram, removes a UDP or TCP/IP header, and extracts a TS stream.

At this time, the IP datagram can have a structure as shown in Tables 8 and 9. Here, the service data packet stream as shown in Table 8 is a packet stream including video and audio data. The ESG data packet stream as shown in Table 9 is a packet stream including digital broadcasting information (such as EPG purchase, multimedia data, and so on). In an embodiment of the present invention, it is assumed that the ESG data packet stream is processed in software. Accordingly, the IP decapsulator 400 transfers the ESG data packet stream to the controller 300. In the case of the service data packet stream as shown in Table 8, a Real-time Transport Protocol (RTP) header is transferred to the controller 110, and the payload part is transferred to the demultiplexer 410. Payload information transferred to the demultiplexer 410 may be a packet stream with an MPEG2 TS structure.

At this time, the demultiplexer 410 has the parallel structure as illustrated in FIG. 7. Accordingly, a broadcasting signal received by the digital broadcasting receiver for processing the broadcasting signal based on IP information as in the DVB-H can be effectively demultiplexed.

Accordingly, the digital broadcasting receiver for processing an IP-based broadcasting signal as in the DVB-H scheme uses a structure for demultiplexing TS data in parallel. The digital broadcasting receiver analyzes a received packet, operates an associated processor when information to be processed is included in the packet, and processes the data, thereby reducing a broadcasting data process time and implementing a high demultiplexing rate.

Second, the digital broadcasting receiver of the DVB-H scheme uses a parallel demultiplexer, and buffers data of a packet size in a buffer in parallel. When the data is processed, processors access the buffer in parallel and simultaneously perform a process, such that a time for transferring data can be significantly reduced and therefore a demultiplexing rate can be significantly improved.

Third, the digital broadcasting receiver of the DVB-H scheme analyzes stored bytes while storing an input packet in a buffer computes a difference value only when a detected sync byte is out of a sync byte position of the buffer, delays the input byte data by the computed difference value, and implements the synchronization, without retrieving all bytes of an input packet when synchronization is detected.

As described above, the digital broadcasting receiver performs a parallel process in a demultiplexer, analyzes a buffered packet, and performs a parallel process in processors, thereby improving a demultiplexing rate. Because the processors access and process packets stored in one buffer, a buffer structure can be simplified and also a data transfer time can be significantly reduced. After a packet input at a demultiplexing time is buffered, a sync byte is identified from buffered data, a difference value between a buffered sync byte position and an originally set sync byte position is set, input data is delayed, and synchronization is acquired. All bytes do not need to be retrieved for the sync detection.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. An apparatus for demultiplexing in a digital broadcasting receiver for processing packet data constructed by a packet header and a payload, comprising:
   a buffer for buffering input packet data; and
   a plurality of processors parallel connected to the buffer, the plurality of processors comprising:
      a packet header processor for checking a packet header of the buffered input packet data, determining if adaptation information is included, and generating a control signal when adaptation information is determined to be present;
      an adaptation information processor, which is controlled by the packet header processor, for processing the adaptation information of the buffered input payload data;
      a Packetized Elementary Stream (PES) header processor, which is controlled by the packet header processor, for processing a PES header of the buffered input payload data; and
      a data processor, which is controlled by the PES header processor, for generating an audio or video Elementary Stream (ES) from audio or video data of the buffered input payload data, and outputting the generated audio or video ES to an associated decoder.

2. The apparatus of claim 1, wherein the packet header processor analyzes an adaptation information control parameter of the packet header, determines if the payload data includes the adaptation information, controls the adaptation information processor to process the adaptation information if the adaptation information is included, and controls an operation of the PES header processor if the adaptation information is not included.

3. The apparatus of claim 2, wherein the adaptation information processor analyzes an adaptation information field buffered in the buffer, analyzes a length of the adaptation information, processes the adaptation information to transfer a process result to a controller when the payload data is constructed by only the adaptation information, reports a position of data except the adaptation information buffered in the buffer to the PES header processor when the payload data includes other data, and processes the adaptation information to transfer a process result to the controller.

4. The apparatus of claim 3, wherein the PES header processor determines if the PES header is included in a payload buffered in the buffer, identifies a length of the PES header to process the PES header and transfer a process result to the controller when the PES header is included, and reports a position of data except the PES header buffered in the buffer to the data processor.

5. The apparatus of claim 4, wherein the packet header processor analyzes a Product Identifier (PID) of the packet header and transfers the PID for identifying a buffered packet to the data processor,
   wherein the data processor generates audio or video ES data from audio or video data of the buffered input payload data, and transfers the generated audio or video ES data to an associated decoder.

6. The apparatus of claim 1, wherein the buffer comprises: first and second buffers having a packet size; and
   an address generator for controlling an operation for outputting packet data stored in the second buffer while the input packet data is stored in the first buffer, and an operation for outputting packet data stored in the first buffer while the input packet data is stored in the second buffer.

7. The apparatus of claim 1, wherein the buffer comprises:
   a dual port memory of a data size;
   a first address generator for storing the input packet data in the memory; and
   a second address generator for outputting the packet data stored in the memory.

8. The apparatus of claim 1, further comprising:
   a sync detector for checking a buffering position of a sync byte in the packet data buffered in the buffer, checking a position out of a sync byte buffering position of the buffer to detect a difference value, delaying byte data of the packet data according to the difference value, and setting packet synchronization.

9. The apparatus of claim 8, wherein the sync detector comprises:
   a sync identification unit for determining if the byte data stored in the buffer is a sync byte;
   a difference extractor for identifying the buffering position of the sync byte stored in the buffer when the sync identification unit detects the sync byte, and computing the difference value between the sync byte buffering position set in the buffer and the buffering position of the stored sync byte; and
   a delay unit for delaying the input packet data according to the computed difference value, and buffering the delayed data in the buffer.

10. The apparatus of claim 9, wherein the sync byte buffering position set in the buffer is a first byte buffering position of the buffer.

11. An apparatus for receiving broadcasting data in a wireless terminal with a digital broadcasting receiver, comprising:
    a broadcasting receiver for receiving and demodulating a signal of a set broadcasting channel and outputting a packet data stream;
    a multimedia processor for analyzing the packet data stream and generating decoded video and audio data;
    a display unit for displaying the decoded video data; and
    a speaker for reproducing the decoded audio data,
    wherein the multimedia processor comprises:
       a demultiplexer comprising:
          a buffer for buffering the packet data stream; and
          processors parallel connected to the buffer, the processors processing the buffered packet data in parallel and performing demultiplexing;
       a video decoder for decoding demultiplexed video Elementary Stream (ES) data; and
       an audio decoder for decoding demultiplexed audio ES data,
    wherein the processors parallel connected to the buffer sequentially analyze packet data buffered in the buffer and process the packet data in the buffer only when specific information is included in the packet data.

12. The apparatus of claim 11, wherein the broadcasting receiver receives and demodulates a broadcasting channel signal at a set frequency, checks a Product Identifier (PID) of a demodulated packet stream, filters packet data of a set broadcasting channel, and generates an Internet Protocol (IP) datagram, and
    wherein the multimedia processor further comprises:
       an IP decapsulator for decapsulating IP information of the IP datagram and outputting a decapsulating result to the demultiplexer.

13. The apparatus of claim 12, wherein the demultiplexer further comprises:
    a buffer for buffering input packet data;
    a packet header processor for checking a packet header of the buffered packet data, determining if adaptation information is included, and generating a control signal when adaptation information is determined to be present;

an adaptation information processor for processing the adaptation information of buffered payload data controlled by the packet header processor;

a Packetized Elementary Stream (PES) header processor for processing a PES header of the buffered payload data controlled by the packet header processor; and a data processor for generating an audio or video Elementary Stream (ES) from audio or video data of the buffered input payload data controlled by the PES header processor, and outputting the generated audio or video ES to an associated decoder.

14. The apparatus of claim 13, further comprising:

a sync detector for checking a buffering position of a sync byte in the packet data buffered in the buffer, checking a position out of a sync byte buffering position of the buffer to detect a difference value, delaying byte data of the packet data according to the difference value, and setting packet synchronization.

15. The apparatus of claim 14, wherein the sync detector comprises:

a sync identification unit for determining if the byte data stored in the buffer is a sync byte;

a difference extractor for identifying the buffering position of the sync byte stored in the buffer when the sync identification unit detects the sync byte, and computing the difference value between the sync byte buffering position set in the buffer and the buffering position of the stored sync byte; and a delay unit for delaying the input packet data according to the computed difference value, and buffering the delayed data in the buffer.

16. The apparatus of claim 15, wherein the sync byte buffering position set in the buffer is a first byte buffering position of the buffer.

17. The apparatus of claim 14, wherein the packet header processor analyzes an adaptation information control parameter of the packet header, determines if the payload data includes the adaptation information, controls the adaptation information processor to process the adaptation information if the adaptation information is included, and controls an operation of the PES header processor if the adaptation information is not included.

18. The apparatus of claim 17, wherein the adaptation information processor analyzes an adaptation information field buffered in the buffer, analyzes a length of the adaptation information, processes the adaptation information to transfer a process result to a controller when the payload data is constructed by only the adaptation information, reports a position of data except the adaptation information buffered in the buffer to the PES header processor when the payload data includes other data, and processes the adaptation information to transfer a process result to the controller.

19. The apparatus of claim 18, wherein the PES header processor determines if the PES header is included in a payload buffered in the buffer, identifies a length of the PES header to process the PES header and transfer a process result to the controller when the PES header is included, and reports a position of data except the PES header buffered in the buffer to the data processor.

20. The apparatus of claim 19, wherein the packet header processor analyzes a Product Identifier (PID) of the packet header and transfers the PID for identifying a buffered packet to the data processor, wherein the data processor generates audio or video ES data from audio or video data of the buffered input payload data, and transfers the generated audio or video ES data to an associated decoder.

21. A method for demultiplexing packet data constructed by a packet header and a payload in a digital broadcasting receiver, comprising the steps of:

buffering input packet data;

checking a buffered packet header and determining if a payload is adaptation information;

processing buffered adaptation information if the payload is the adaptation information;

checking the payload if the payload is not the adaptation information, determining if a Packetized Elementary Stream (PES) header is included in the payload, checking a size of the PES header included in the payload if the PES header is included, determining if audio/video data is included, setting a buffering position of the audio/video data if the audio/video data is included, and processing the PES header; and processing the audio/video data of the payload after the PES header is processed or if, the PES header is not included in the payload of the packet data, generating an audio/video Elementary Stream (ES) and transferring the generated audio/video ES to an associated decoder;

a sync detection for checking a buffering position of a sync byte in the buffered packet data, checking a position out of a sync byte buffering position to detect a difference value, delaying byte data of the packet data according to the difference value, and setting packet synchronization, wherein the sync detection step comprises the steps of:

determining if the byte data stored in a buffer is a sync byte;

identifying the buffering position of the sync byte stored in the buffer when the sync byte is detected, and computing the difference value between the sync byte buffering position set in the buffer and the buffering position of the stored sync byte; and delaying the input packet data according to the computed difference value, and buffering the delayed data in the buffer.

22. The method of claim 21, wherein the sync byte buffering position set in the buffer is a first byte buffering position of the buffer for buffering first packet data.

23. A method for demultiplexing packet data constructed by a packet header and a payload in a digital broadcasting receiver, comprising the steps of:

buffering input packet data;

checking a buffered packet header and determining if a payload is adaptation information;

processing buffered adaptation information if the payload is the adaptation information;

checking the payload if the payload is not the adaptation information, determining if a Packetized Elementary Stream (PES) header is included in the payload, checking a size of the PES header included in the payload if the PES header is included, determining if audio/video data is included, setting a buffering position of the audio/video data if the audio/video data is included, and processing the PES header; and processing the audio/video data of the payload after the PES header is processed or if, the PES header is not included in the payload of the packet data, generating an audio/video Elementary Stream (ES) and transferring the generated audio/video ES to an associated decoder;

a sync detection for checking a buffering position of a sync byte in the buffered packet data, checking a position out of a sync byte buffering position to detect a difference value, delaying byte data of the packet data according to the difference value, and setting packet synchronization, wherein the step of processing the packet header comprises the steps of:
- determining if a Product Identifier (PID) of the packet header is a target PID, and storing information for identifying a type of an input packet only when the PID of the packet header is the target PID;
- analyzing an adaptation information control parameter of the packet header, issuing a command for an adaptation information processing operation if a buffered packet includes the adaptation information, and transferring buffering position information of the adaptation information to be processed in the adaptation information processing operation; and
- issuing a command for a PES header processing operation if a buffered packet does not include the adaptation information, and transferring buffering position information of the PES header to be processed in the PES header processing operation.

24. The method of claim 23, wherein the step of processing the adaptation information comprises the steps of:
- accessing the adaptation information buffered in the buffer and analyzing a length of the adaptation information when the operation command is received;
- processing the adaptation information to transfer a processing result to a controller when the packet is constructed by only the adaptation information in the analyzing step; and
- transferring the operation command and buffering position information of the PES header when the packet includes the PES header, processing the adaptation information, and transfers a processing result to the controller.

25. The method of claim 24, wherein the step of processing the PES header comprises the steps of:
- accessing the PES header buffered in the buffer and analyzing a length of the PES header when the operation command is received;
- processing the PES header to transfer a processing result to a controller when the packet is constructed by only the PES header in the analyzing step; and
- transferring an operation command for a data processor and buffering position information of actual data when the buffered packet includes the actual data in the analyzing step, transferring a command for a data processing operation and position information of buffered actual data, processing the PES header, and transferring a processing result to the controller.

26. The method of claim 25, wherein the step of processing the data comprises the steps of:
- identifying a type of the packet according to a stored PID when the operation command is received; and
- accessing the buffered actual data, generating a video or audio ES from the actual data according to the identified PID, and demultiplexing the video or audio ES into the associated decoder.

27. A method for processing broadcasting data in a wireless terminal with a digital broadcasting receiver, comprising the steps of:
- performing a broadcasting data reception operation for receiving and demodulating a signal of a set broadcasting channel and outputting a packet data stream;
- performing, by processors that are parallel connected to a buffer, a multimedia data processing operation for analyzing the packet data stream and generating decoded video and audio data; and
- reproducing the decoded video and audio data, wherein performing the multimedia data processing operation comprises:
- buffering the packet data stream;
- checking a packet header and a payload of buffered packet data;
- processing the buffered packet data in parallel;
- performing demultiplexing into video and audio Elementary Stream (ES) data; and
- decoding the demultiplexed video and audio ES data, wherein in the multimedia data processing operation, each of the processors parallel connected to the buffer sequentially analyze packet data buffered in the buffer and process the packet data in the buffer only when specific information is included in the packet data.

28. The method of claim 27, wherein the step of receiving the broadcasting data comprises the steps of:
- receiving and demodulating a broadcasting channel signal at a set frequency, checking a Product Identifier (PID) of a demodulated packet stream, filtering packet data of a set broadcasting channel, and generating an Internet Protocol (IP) datagram, wherein the step of processing the multimedia data further comprises the step of:
- decapsulating IP information of the IP datagram, and
- wherein a packet data stream from the IP information is decapsulated and demultiplexed.

29. The method of claim 28, wherein the demultiplexing step comprises the steps of:
- buffering input packet data;
- checking a buffered packet header and determining if the payload is adaptation information;
- processing buffered adaptation information if the payload is the adaptation information;
- checking the payload if the payload is not the adaptation information, determining if a Packetized Elementary Stream (PES) header is included in the payload, checking a size of the PES header included in the payload if the PES header is included, determining if audio/video data is included, setting a buffering position of the audio/video data if the audio/video data is included, and processing the PES header; and
- processing the audio/video data of the payload after the PES header is processed or if the PES header is not included in the payload of the packet data, generating an audio/video ES, and transferring the generated audio/video ES to an associated decoder.

30. The method of claim 29, further comprising the step of a sync detection for checking a buffering position of a sync byte in the buffered packet data, checking a sync byte buffering position to detect a difference value, delaying byte data of the packet data according to the difference value, and setting packet synchronization.

* * * * *